(12) United States Patent
Chapman et al.

(10) Patent No.: US 10,909,150 B2
(45) Date of Patent: Feb. 2, 2021

(54) DECENTRALIZED LATENT SEMANTIC INDEX USING DISTRIBUTED AVERAGE CONSENSUS

(71) Applicant: Hyperdyne, Inc., Palo Alto, CA (US)

(72) Inventors: Todd Allen Chapman, Palo Alto, CA (US); Ivan James Ravlich, Los Altos, CA (US); Christopher Taylor Hansen, Sunnyvale, CA (US); Daniel Maren, Los Altos, CA (US)

(73) Assignee: HYPERNET LABS, INC., Redwood City, CA (US)

( * ) Notice: Subject to any disclaimer, the term of this patent is extended or adjusted under 35 U.S.C. 154(b) by 132 days.

(21) Appl. No.: 16/252,467

(22) Filed: Jan. 18, 2019

(65) Prior Publication Data

US 2019/0228025 A1   Jul. 25, 2019

Related U.S. Application Data

(60) Provisional application No. 62/619,715, filed on Jan. 19, 2018, provisional application No. 62/619,719, (Continued)

(51) Int. Cl.
*G06F 16/31* (2019.01)
*G06F 17/16* (2006.01)
*G06F 16/33* (2019.01)

(52) U.S. Cl.
CPC ........ *G06F 16/313* (2019.01); *G06F 16/3344* (2019.01); *G06F 16/3347* (2019.01); *G06F 17/16* (2013.01)

(58) Field of Classification Search
CPC ............... G06F 16/313; G06F 16/3347; G06F 16/3344; G06F 17/16; G06F 16/285
(Continued)

(56) References Cited

U.S. PATENT DOCUMENTS 9,646,029 B1    5/2017  Baird
9,817,701 B2   11/2017  Baptist et al.
(Continued)

OTHER PUBLICATIONS

PCT International Search Report and Written Opinion, PCT Application No. PCT/US19/14351, dated May 24, 2019, 16 pages.
(Continued)

*Primary Examiner* — Hosain T Alam
*Assistant Examiner* — Nicholas E Allen
(74) *Attorney, Agent, or Firm* — Fenwick & West LLP

(57) ABSTRACT

A distributed computing device calculates word counts for each of a set of documents. The word counts are represented as values, each representing a number of times a corresponding word appears in one of the set of documents. The distributed computing device randomly samples the word counts to calculate sampled word counts. The distributed computing device and additional distributed computing devices iteratively execute a process to determine a consensus result for the sampled word counts based on the sampled word counts and additional sampled word counts calculated by the additional distributed computing devices. The distributed computing device determines a latent semantic index (LSI) subspace based on the consensus result for the sampled word count and reflecting contents of the set and additional sets of documents. The distributed computing device projects a document into the LSI subspace to determine the latent semantic content of the document.

12 Claims, 11 Drawing Sheets

Related U.S. Application Data filed on Jan. 19, 2018, provisional application No. 62/662,059, filed on Apr. 24, 2018, provisional application No. 62/700,153, filed on Jul. 18, 2018, provisional application No. 62/727,357, filed on Sep. 5, 2018.

(58) Field of Classification Search
USPC .......................................................... 707/739
See application file for complete search history.

(56) References Cited

U.S. PATENT DOCUMENTS

| | | | |
|---|---|---|---|
| 9,858,052 | B2 | 1/2018 | Bornstein et al. |
| 10,645,024 | B2 | 5/2020 | Quirk et al. |
| 2002/0147628 | A1 | 10/2002 | Specter et al. |
| 2006/0020662 | A1 | 1/2006 | Robinson |
| 2007/0118518 | A1* | 5/2007 | Wu ........................ G06F 16/345 |
| 2010/0161596 | A1 | 6/2010 | Yan et al. |
| 2010/0169340 | A1 | 7/2010 | Kenedy et al. |
| 2011/0106743 | A1* | 5/2011 | Duchon .................. G06F 16/35 |
| | | | 706/46 |
| 2013/0132392 | A1 | 5/2013 | Kenedy et al. |
| 2013/0151927 | A1 | 6/2013 | Leggette et al. |
| 2014/0025216 | A1 | 1/2014 | Husen et al. |
| 2014/0074269 | A1 | 3/2014 | Weston et al. |
| 2014/0282244 | A1* | 9/2014 | Speer .................... G06F 16/444 |
| | | | 715/811 |
| 2015/0254328 | A1* | 9/2015 | Dereszynski ...... G06Q 30/0277 |
| | | | 707/739 |
| 2015/0256897 | A1 | 9/2015 | Van Stam |
| 2015/0278200 | A1* | 10/2015 | He ........................ G06F 40/194 |
| | | | 704/2 |
| 2015/0312335 | A1 | 10/2015 | Ying et al. |
| 2016/0036925 | A1 | 2/2016 | Quirk et al. |
| 2016/0154798 | A1* | 6/2016 | Davis .................... G06F 16/951 |
| | | | 707/730 |
| 2016/0155067 | A1* | 6/2016 | Dubnov .................. G06F 40/30 |
| | | | 706/12 |
| 2016/0248631 | A1 | 8/2016 | Duchesneau |
| 2016/0328253 | A1 | 11/2016 | Majumdar |
| 2017/0103468 | A1 | 4/2017 | Orsini et al. |
| 2017/0132630 | A1 | 5/2017 | Castinado et al. |
| 2017/0140262 | A1 | 5/2017 | Wilson et al. |
| 2017/0171580 | A1* | 6/2017 | Hirsch ............... H04N 21/6125 |
| 2017/0173262 | A1 | 6/2017 | Veltz |
| 2017/0185672 | A1* | 6/2017 | Yu ......................... G06F 16/951 |
| 2017/0331696 | A1 | 11/2017 | Gupta et al. |
| 2018/0150299 | A1 | 5/2018 | Balle et al. |
| 2018/0300315 | A1* | 10/2018 | Leal ........................ G06F 16/36 |
| 2018/0314735 | A1* | 11/2018 | Liu ........................... G06N 5/04 |

OTHER PUBLICATIONS

PCT Invitation to Pay Additional Fees and, Where Applicable, Protest Fee, PCT Application No. PCT/US19/14351, Mar. 27, 2019, 2 pages.

Xiao, L. et al., "Distributed average consensus with least-mean-square deviation," *J. Parallel Distrib. Comput.*, 2007, vol. 67, pp. 33-46.

Baraglia, R. et al, "A peer-to-peer recommender system for self-emerging user communications based on gossip overlays," *Journal of Computer and System Sciences*, vol. 79, 2013, pp. 291-308.

Souptik, D. et al., "Uniform Data Sampling from a Peer-to-Peer Network," 27th International Conference on Distributed Computing Systems, Jun. 2007.

Wissman, B., "Peer-to-Peer is the Next Wave of Influencer Marketing," obtained online on Sep. 9, 2020 from https://www.entrepeneur.com/article/334472, dated Jun. 20, 2019.

\* cited by examiner

DECENTRALIZED LATENT SEMANTIC INDEX USING DISTRIBUTED AVERAGE CONSENSUS

CROSS REFERENCE TO RELATED APPLICATIONS

This application claims the benefit of U.S. Provisional Application No. 62/619,715, filed Jan. 19, 2018; U.S. Provisional Application No. 62/619,719, filed Jan. 19, 2018; U.S. Provisional Application No. 62/662,059, filed Apr. 24, 2018; U.S. Provisional Application No. 62/700,153, filed Jul. 18, 2018; and U.S. Provisional Application No. 62/727,357, filed Sep. 5, 2018, each of which is incorporated by reference in its entirety.

BACKGROUND

Convergence in Distributed Computing

Distributed computing can be used to break a large computation into sub-components, assign distributed computing devices components of the computation, and combine the results from the distributed computing devices to generate the result of the computation. Existing methods for distributed computing use various techniques to obtain a result from a distributed computing task, e.g., selecting a coordinator to evaluate the sub-component results, or determining a majority result. Typical distributed computing operations are designed to be fault-tolerant, which allows convergence even if a computing device was not able to perform its assigned portion of the computation. However, such operations also allow a computing device that claims to contribute to the computation, but did not contribute, to converge with the other computing devices. Thus, in a typical distributed computing operation, the convergence result will not indicate if any computing devices did not participate in calculating the result. This is problematic in situations where computing devices receive compensation for their work, because a computing device may be able to receive compensation without performing any work.

Updating AI Models

One use for distributed computing devices relates to improving artificial intelligence (AI) models. Distributed computers connected to a network can implement an AI model and also collect data that is used to update and improve the AI model. In current systems for improving AI models using data collected by the distributed computers, a "gather and scatter" method is used to generate and propagate updates to the AI models determined from the collected data. In the gather and scatter method, distributed computers collect data and transmit the data to a central server. The central server updates the AI model and transmits the updated AI model to the distributed computers. The central server must be reliable, and each distributed computer must have a reliable connection to the server to provide data to and receive model updates from the central server. This gather and scatter method requires a large amount of computing to be performed at the central server, and does not take advantage of the computing resources of the distributed computers.

Latent Semantic Indexing

Latent semantic indexing (LSI) is a mathematical tool for indexing text that is used for indexing and retrieving content from a large number of unstructured text-based documents, such as web pages. LSI is used for various applications, such as search engines and document comparison. In current search engines, a central server indexes a set of searchable content and allows other users to search this content through the central server. For example, a search engine uses a web crawler to retrieve publicly-accessible websites or other documents and stores information describing the documents' content. The search engine provides a search interface to which a user can submit queries, and upon receiving a search query, the search engine compares the query to the stored information and provides relevant results.

In current search implementations, the search engine system obtains and analyzes both the documents being searched and the search queries. Thus, current search engines require information providers to make their documents publicly available, or at least available to the search engine, to allow others to search the documents. In addition, centralized search engines can collect data on its users' behaviors. Many information providers and users would prefer a search implementation that does not involve a centralized system collecting and storing their data.

SUMMARY

Systems and methods for performing computations in a distributed environment are described herein. To perform a computation in the distributed environment, different portions of the computation are assigned to different computing devices, and the results of the portions are combined to determine the computation result. The computation is portioned in such a way that the computing devices can exchange their portioned results in a peer-to-peer fashion, and perform a consensus algorithm that both (1) obtains the final computation result and (2) confirms that all of the contributing devices have performed their assigned portion of the computation. In particular, the computing devices perform a distributed average consensus (DAC) algorithm in which the computing devices repeatedly form connections, exchange data, and calculate an average of the exchanged data, which is used as the data to exchange in a subsequent step. When this procedure leads to a consensus (e.g., the averages across all computing devices settle around a consensus average value), the result of the DAC algorithm indicates whether each computing device has contributed to the calculation of the average. Thus, the DAC procedure is able to confirm that each computing device in the distributed environment has contributed to the calculation. The DAC procedure confirms that each computing device has participated using the same connections that are used to obtain the consensus result; thus, no additional routing protocols or overlay topologies are needed to confirm participation.

In addition to the DAC environment and algorithm, several exemplary applications for DAC are described herein. Distributed implementations for calculating a dot product, calculating a matrix-vector product, calculating a least squares calculation, and performing decentralized Bayesian parameter learning are described. A method for distributed AI learning is also described. A method for generating a subspace for latent semantic indexing, and exemplary uses of the latent semantic index, are also described.

As disclosed herein, to generate a latent semantic index and enable searching in a distributed manner, a set of cooperating distributed computing devices use a cooperative subspace approach that combines the DAC algorithm with the theory of random sampling. Each cooperating distributed computing device stores one or more documents, and the documents distributed across the set of cooperating distributed computing devices are jointly referred to as a corpus of documents. The documents in the corpus may be documents that their respective users plan to make available for searching by other distributed computing devices, e.g., documents that can be searched by some or all of the cooperating distributed computing devices and/or other devices.

The cooperating distributed computing devices jointly generate a latent semantic index based on the corpus of documents, without the contents of any individual document being exposed to other distributed computing devices. First, each distributed computing device individually analyzes its locally-stored documents, and randomly samples the results of this analysis to generate a matrix that approximates and obscures the content of the local documents in each distributed computing device. The distributed computing devices share their matrices and perform the DAC algorithm described above to generate a matrix reflecting the corpus of documents stored by of all cooperating distributed computing devices. Each distributed computing device then extracts a low-dimension latent semantic index (LSI) subspace from the matrix based on the DAC result. This LSI subspace reflects the analysis of all of the documents in the corpus, but is much smaller than a matrix concatenating the raw analysis results of the local documents in each distributed computing device. The cooperative subspace approach allows the LSI subspace to be calculated efficiently, and the random sampling obscures the underlying documents so that privacy is maintained.

In one embodiment, a method for generating a latent semantic index is described. A distributed computing device calculates word counts for each of a set of documents. The word counts for each of the set of documents are represented as a plurality of values, each value representing a number of times a corresponding word appears in one of the set of documents. The distributed computing device calculates sampled word counts by randomly sampling the word counts. The distributed computing device, in conjunction with a plurality of additional distributed computing devices connected to the distributed computing device by a network, iteratively executes a process to determine a consensus result for the sampled word counts. The consensus result is based on the sampled word counts calculated by the distributed computing device and additional sampled word counts calculated by the plurality of additional distributed computing devices, the additional sampled user word counts based on additional sets of documents. The distributed computing device determines a latent semantic index (LSI) subspace based on the consensus result for the sampled word counts. The LSI subspace reflects contents of the set of documents and the additional sets of documents. The distributed computing device projects a document into the LSI subspace to determine the latent semantic content of the document.

In one embodiment, a method for performing a search is described. A search device calculates a word count vector for one of a document or a set of keywords. Each element of the word count vector has a value representing instances of a different word in the document or the set of keywords. The search device projects projecting the word count vector into a latent semantic index (LSI) subspace to generate a subspace search vector characterizing the document in the LSI subspace. The LSI subspace is generated cooperatively by a plurality of distributed computing devices connected by a network based on a corpus of documents, the LSI subspace reflecting contents of the corpus of documents. The search device transmits the subspace search vector to a target device as a search request. The search device receives from the target device, in response to the search request, data describing a target document that matches the search request. The target device determines that the target document matches the search request by comparing the subspace search vector to a target vector characterizing the target document in the LSI subspace.

DETAILED DESCRIPTION

Figure 1:
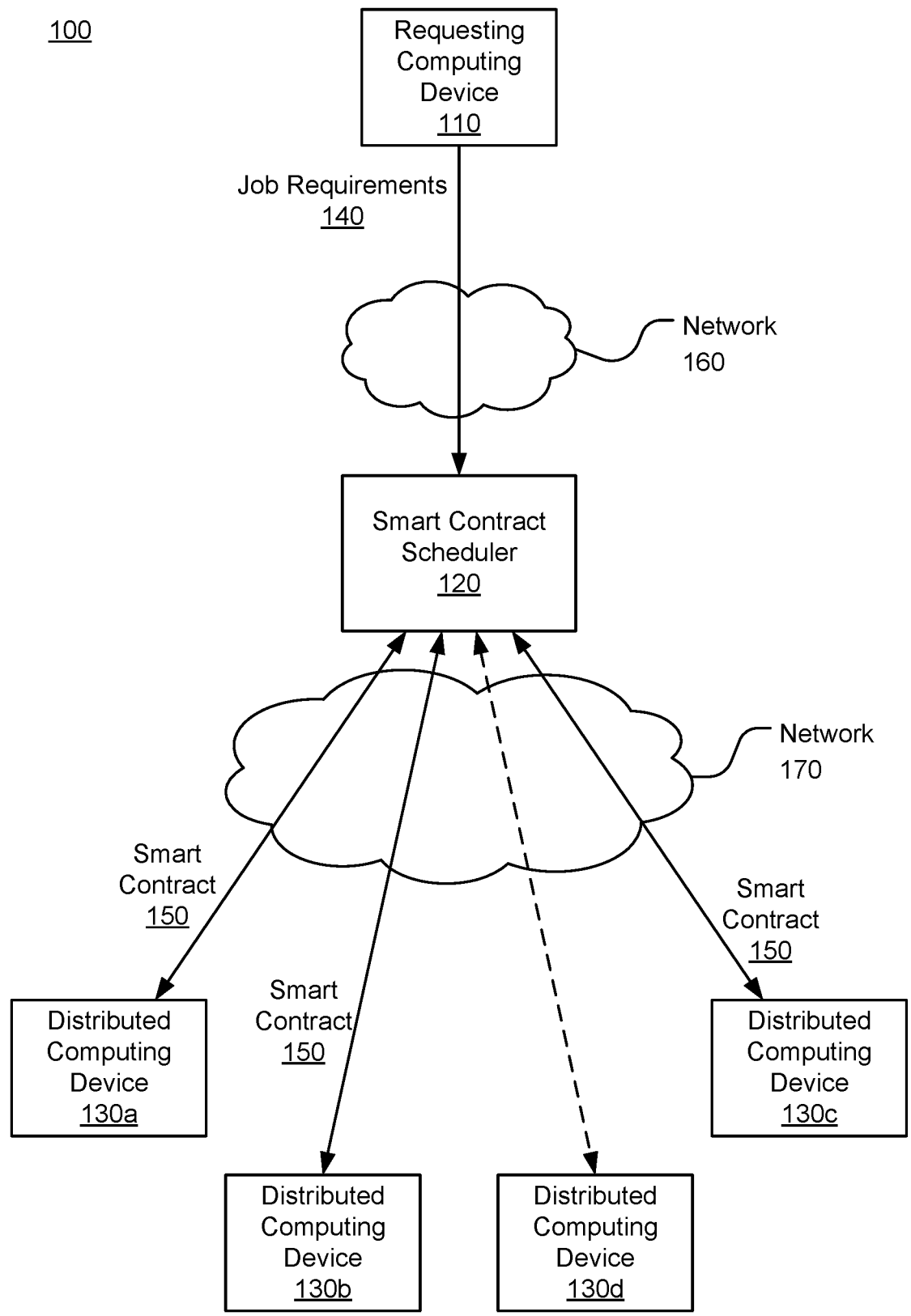
FIG. 1 is a flow diagram showing contract formation in an environment for distributed computing, according to one embodiment.

The Figures (FIGs.) and the following description describe certain embodiments by way of illustration only. One skilled in the art will readily recognize from the following description that alternative embodiments of the structures and methods illustrated herein may be employed without departing from the principles described herein.

Reference will now be made in detail to several embodiments, examples of which are illustrated in the accompanying figures.

It is noted that wherever practicable similar or like reference numbers may be used in the figures and may indicate similar or like functionality. A letter after a reference numeral, such as "130a," indicates that the text refers specifically to the element having that particular reference numeral. A reference numeral in the text without a following letter, such as "130," refers to any or all of the elements in the figures bearing that reference numeral. For example, "130" in the text refers to reference numerals "130a" and/or "130b" and/or "130c" in the figures.

Distributed Average Consensus (DAC) Environment

The DAC algorithm can be implemented in a two-sided market that includes requesting computing devices seeking computing power and distributed computing devices that provide computing power. The requesting computing devices, or users of the requesting computing devices, want to run a computing task on the distributed computing devices. The requesting computing devices may be used by scientists, statisticians, engineers, financial analysts, etc. The requesting computing device can transmit requests to one or more intermediary computing devices, which coordinate the fulfillment of the request with a set of distributed computing devices. The requesting computing devices request compute time on the distributed computing devices, and may provide compensation to the distributed computing devices in exchange for compute time. The arrangement between a requesting computing device and a set of distributed computing devices can be represented by a smart contract. A smart contract is an agreement made between multiple computing devices (e.g., a set of distributed computing devices, or a requesting computing device and a set of distributed computing devices) to commit computing resources to a computing task. A smart contract specifies a set of technical requirements for completing the computing task, and may specify compensation for completing the computing task or a portion of the computing task. The smart contract may include a list of distributed computing devices that have agreed to the smart contract. In some embodiments, smart contracts are published to a blockchain.

The requesting computing devices, intermediary computing devices, and distributed computing devices are computing devices capable of transmitting and receiving data via a network. Any of the computing devices described herein may be a conventional computer system, such as a desktop computer or a laptop computer. Alternatively, a computing device may be any device having computer functionality, such as a mobile computing device, server, tablet, smartphones, smart appliance, personal digital assistant (PDA), etc. The computing devices are configured to communicate via a network, which may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP).

FIG. 1 illustrates contract formation in an exemplary environment 100 for distributed computing. In the example shown in FIG. 1, a requesting computing device 110 communicates over a network 160 with a smart contract scheduler 120, which is an intermediary computing device that coordinates computing resources for performing distributed computing tasks. The environment 100 also includes a set of distributed computing devices 130 that can connect to each other and to the smart contract scheduler 120 over a network 170. The networks 160 and 170 may be the same network, e.g., the Internet, or they may be different networks. FIG. 1 shows four distributed computing devices 130a, 130b, 130c, and 130d, but it should be understood that the environment 100 can include many more distributed computing devices, e.g., millions of distributed computing devices 130. Similarly, the environment 100 can include additional requesting computing devices 110 and smart contract schedulers 120. While the requesting computing device 110, smart contract scheduler 120, and distributed computing devices 130 are shown as separate computing devices, in other embodiments, some of the components in the environment 100 may be combined as a single physical computing device. For example, the requesting computing device 110 may include a smart contract scheduling component. As another example, the requesting computing device 110 and/or smart contract scheduler 120 are also distributed computing devices 130 with computing resources for performing requested calculations.

To request computation of a given computing task, the requesting computing device 110 transmits a set of job requirements 140 to the smart contract scheduler 120 over the network 160. The job requirements 140 may include, for example, minimum technical requirements for performing the task or a portion of the task, such as memory, disk space, number of processors, or network bandwidth. The job requirements 140 also include an amount and/or type of compensation offered by the requesting computing device 110 for the task or a portion of the task.

The smart contract scheduler 120 generates a smart contract 150 for the requesting computing device 110 based on the job requirements 140 and transmits the smart contract 150 to the distributed computing devices 130 over the network 170. The smart contract scheduler 120 may broadcast the smart contract 150 to all participating distributed computing devices 130, or transmit the smart contract 150 to some subset of the distributed computing devices 130. For example, the smart contract scheduler 120 may maintain a list of distributed computing devices 130 and their technical specifications, and identify a subset of the distributed computing devices 130 that meet one or more technical requirements provided in the job requirements 140. As another example, the smart contract scheduler 120 may determine, based on prior smart contracts, distributed computing devices 130 that are currently engaged with tasks for other smart contracts, and identify a subset of the distributed computing devices 130 that may be available for the smart contract 150.

Each distributed computing device 130 that receives the smart contract 150 from the smart contract scheduler 120 can independently determine whether the technical requirements and compensation are suitable. At least some portion of distributed computing devices 130 agree to the smart contract 150 and transmit their acceptance of the contract to the smart contract scheduler 120 over the network 170. In the example shown in FIG. 1, distributed computing devices 130a, 130b, and 130c agree to the smart contract 150, and distributed computing device 130d has not agreed to the smart contract. The distributed computing devices 130a-130c that agree to the smart contract 150 may each publish a signed copy of the smart contract 150 to a blockchain in which the distributed computing devices 130 and the smart contract scheduler 120 participate. Contracts published to the blockchain can be received by all participants, including the smart contract scheduler 120 and, in some embodiments, the requesting computing device 110.

While three distributed computing devices 130a-130c are shown as signing the smart contract 150 in FIG. 1, it should be understood that additional distributed computing devices 130 (e.g., tens of computing devices, thousands of computing devices, etc.) can sign a single smart contract and participate in the computing task. In some embodiments, the smart contract 150 specifies a requisite number of distributed computing devices 130 for performing the computing task. Once the requisite number of distributed computing devices publish their acceptance of the smart contract 150 to the blockchain, the distributed computing devices that have committed to the contract complete the computing task.

Once the distributed computing devices 130 have agreed to cooperate on the task, the distributed computing devices receive code provided by the requesting computing device 110 with instructions for completing the computing task. The requesting computing device 110 may transmit the code directly to the distributed computing devices 130a-130c over the network 170, or the requesting computing device 110 may provide the code to the distributed computing devices 130a-130c via the smart contract scheduler 120. In some embodiments, the code include checkpoints, which are used to indicate suitable restart locations for long-running calculations. In a long calculation, the code may fail before completion of a task, but after a distributed computing device 130 has performed a substantial amount of work. When a distributed computing device 130 successfully reach a specified checkpoint, the distributed computing device 130 is compensated for the work it has done up to that checkpoint.

In some embodiments, the distributed computing devices 130 cooperate for computing tasks that benefit the distributed computing devices 130 themselves, rather than for the benefit of a particular requesting computing device 110. For example, the distributed computing devices 130 may perform a DAC procedure for cooperative learning, such as decentralized Bayesian parameter learning or neural network training, described in further detail below. In such embodiments, a distributed computing device 130 may not receive compensation from a requesting computing device, but instead receives the benefit of data and cooperation from the other distributed computing devices 130. The distributed computing devices 130 may sign a smart contract 150 with each other, rather than with a requesting computing device 110 outside of the group of distributed computing devices 130. Alternatively, the distributed computing devices 130 may cooperate on computing tasks without a smart contract 150. The distributed computing devices 130 may receive code for performing the calculations from a coordinating computing device, which may be one of the distributed computing devices 130 or another computing device.

The distributed computing devices 130 provide connection information to the other distributed computing devices 130 so that they are able to communicate their results to each other over the network 170. For example, the smart contract 150 may be implemented by a blockchain accessed by each of the distributed computing devices 130 and on which each distributed computing device 130 publishes connection information.

Figure 2:
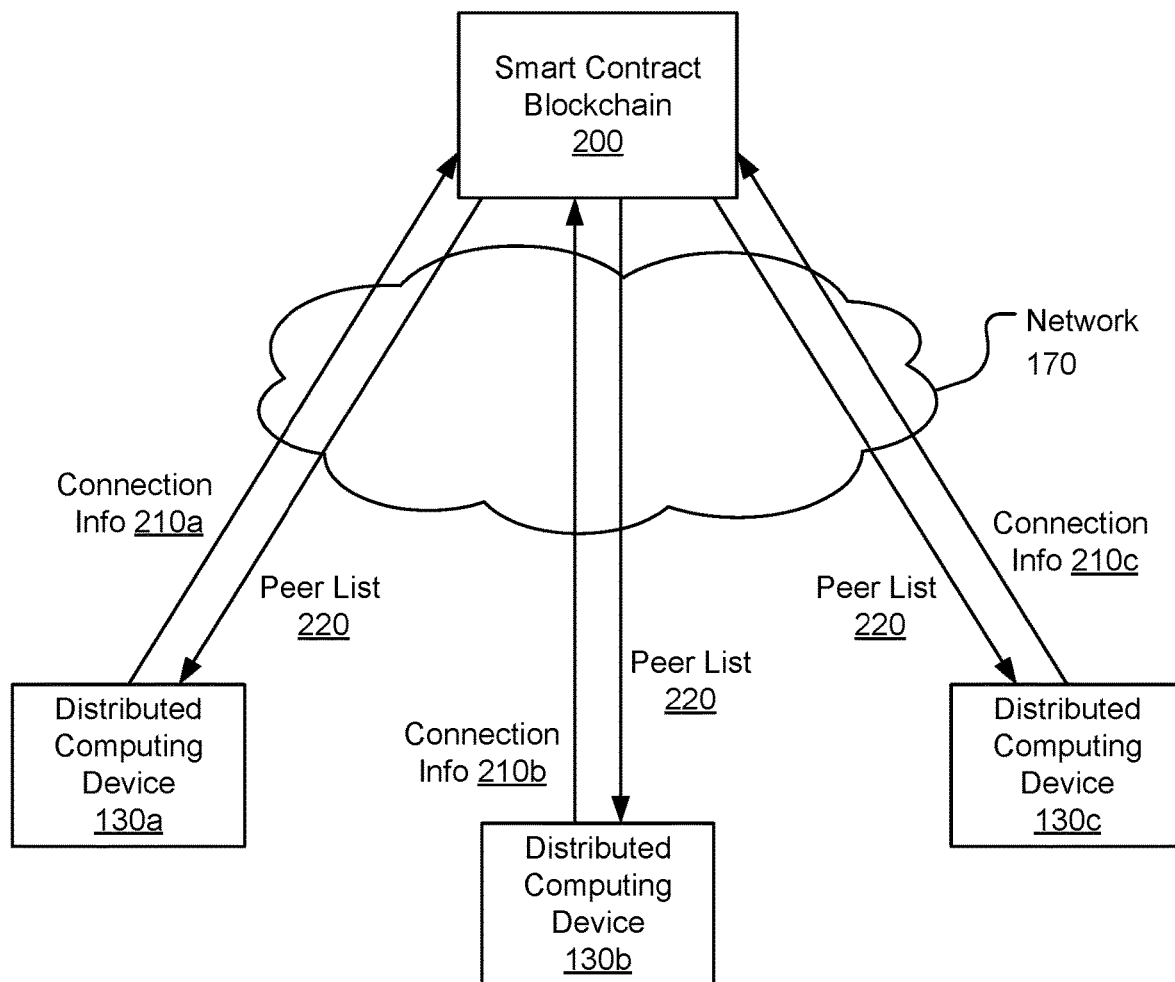
FIG. 2 is a flow diagram showing publishing of distributed computing device information in the environment of for distributed computing, according to one embodiment.

FIG. 2 is a flow diagram showing publishing of distributed computing device information in the environment for distributed computing shown in FIG. 1. The distributed computing devices 130a, 130b, and 130c that have signed the smart contract 150 each publish their respective connection information 210a, 210b, and 210c to a smart contract blockchain 200 over the network 170. Information published to the smart contract blockchain 200 is received by each of the distributed computing devices 130a-130c over the network 170. The connection information 210 can be, for example, the IP address of the distributed computing device 130 and the port on which the distributed computing device 130 wishes to receive communications from the other distributed computing devices. The distributed computing devices 130 each compile a peer list 220 based on the information published to the smart contract blockchain 200. The peer list 220 includes the connection information 210 for some or all of the distributed computing devices 130 that signed the smart contract 150. The peer list 220 allows each distributed computing device 130 to communicate with at least a portion of the other distributed computing devices over the network 170. Each distributed computing device 130 stores a local copy of the peer list 220. If the peer list 220 includes a portion of the distributed computing devices 130 that signed the smart contract 150, the peer lists 220 stored on different distributed computing devices 130 are different, e.g., each distributed computing device 130 may store a unique peer list containing some portion of the distributed computing devices 130 that signed the smart contract 150.

Figure 3:
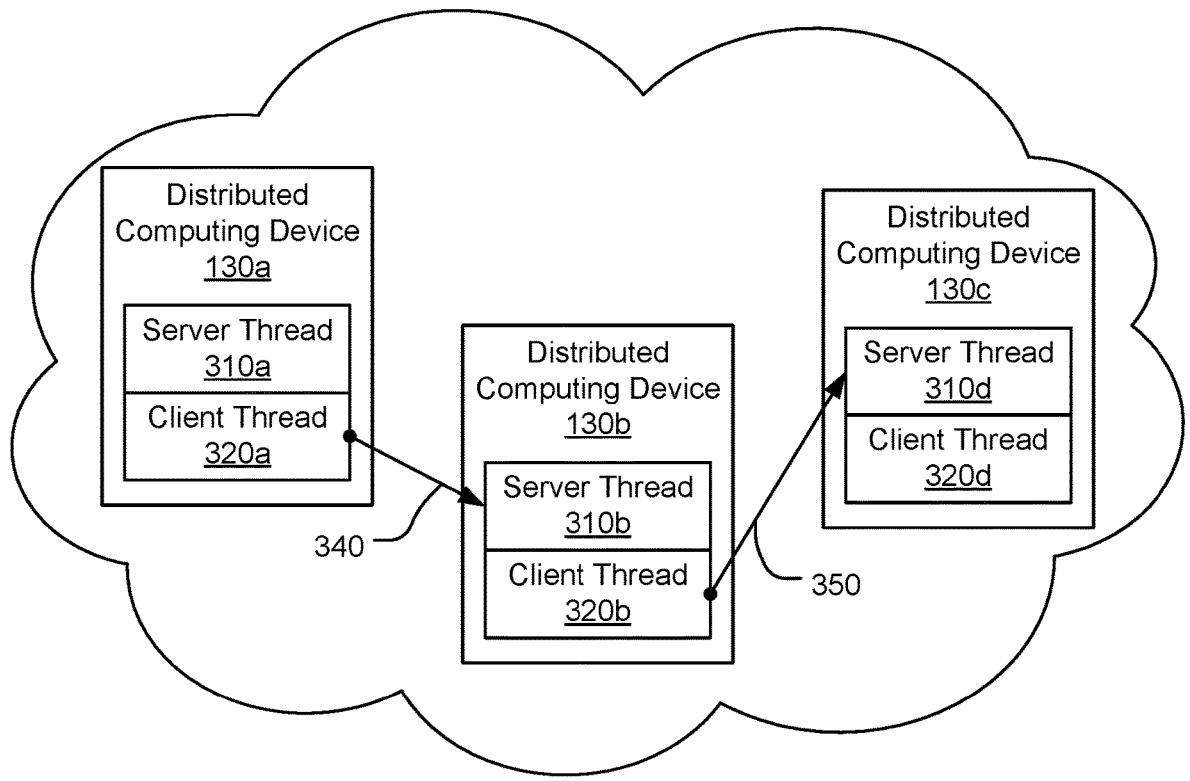
FIG. 3 is a block diagram showing peer-to-peer connections between distributed computing devices, according to one embodiment.

FIG. 3 illustrates peer-to-peer connections formed between distributed computing devices according to the peer list 220. After each distributed computing device 130 has performed its portion of the computation, the distributed computing devices 130 connect to each other (e.g., over the network 170 shown in FIGS. 1 and 2) to share results. To form the connections, each distributed computing device 130 initializes a server thread 310 to listen to the port that it posted to the smart contract blockchain 200, i.e., the port it provided in the connection information 210. Each distributed computing device 130 also initializes a client thread 320 capable of connecting to another distributed computing device 130. In the example shown in FIG. 3, the client thread 320a of distributed computing device 130a has formed a connection 340 to the server thread 310b of distributed computing device 130b using the connection information 210b provided by distributed computing device 130b. In addition, the client thread 320b of distributed computing device 130b has formed a connection 350 to the server thread 310c of distributed computing device 130c using the connection information 210c provided by distributed computing device 130c. Distributed computing devices 130a and 130b can share computing results over the connection 340, and distributed computing devices 130b and 130c can share computing results over the connection 350.

While three distributed computing devices 130 that signed the smart contract 150 are illustrated in FIGS. 1-3, in many cases, more distributed computing devices are involved in a computing task. According to the DAC protocol, the distributed computing devices 130 undertake a sequence of forming connections, sharing results, computing an average, and determining whether consensus is reached. If consensus has not been reached, the distributed computing devices 130 form a new set of connections, share current results (i.e., the most recently computed averages), compute a new average, and again determine whether consensus is reached. This process continues iteratively until consensus is reached. A mathematical discussion of the DAC algorithm is described in greater detail below.

Figure 4A:
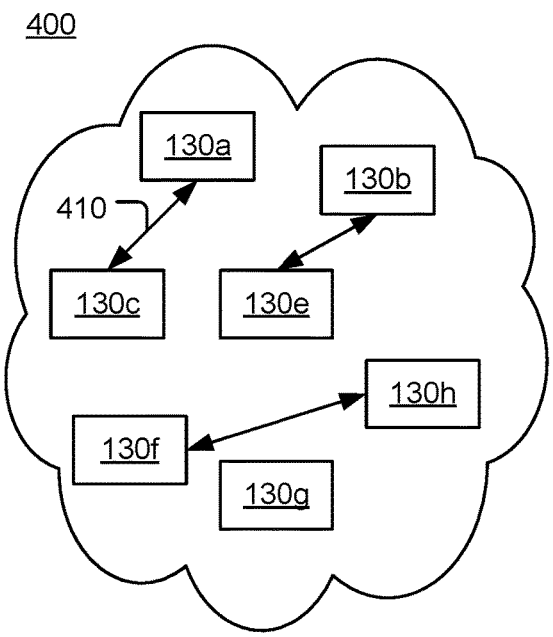
FIG. 4A is a diagram showing a first arrangement of peer connections among a group of distributed computing devices at a first time, according to one embodiment.

FIG. 4A illustrates a first arrangement 400 of peer connections formed among a group of seven distributed computing devices at a first time, according to one embodiment. FIG. 4A includes a set of seven distributed computing devices 130a-130g that have connected to form three sets of pairs. For example, distributed computing devices 130a is connected to distributed computing device 130c over connection 410. The distributed computing devices 130, or some portion of the distributed computing devices 130, may each select a random computing device from the pair list 220 and attempt to form a peer-to-peer connection. In the example shown in FIG. 4A, distributed computing device 130g has not formed a connection to any other distributed computing device in this iteration. In some embodiments, a single distributed computing device 130 may be connected to two other distributed computing devices, e.g., both the client thread and the server thread are connected to a respective computing device.

Figure 4B:
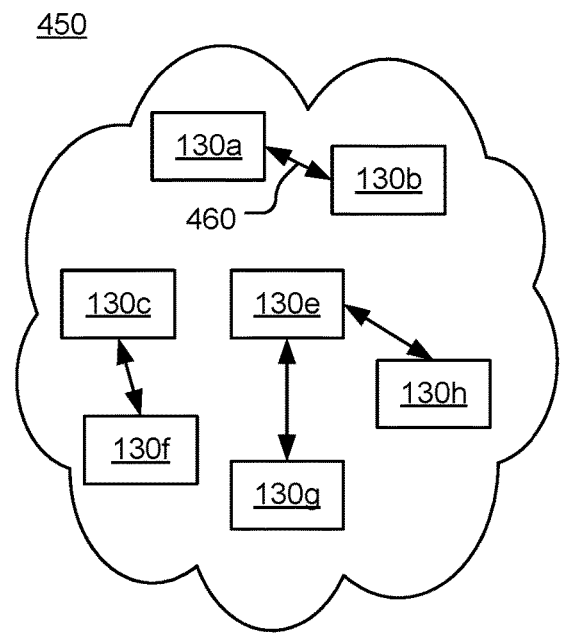
FIG. 4B is a diagram showing a second arrangement of peer-to-peer connections among the group of distributed computing devices at a second time, according to one embodiment.

FIG. 4B illustrates a second arrangement 450 of peer-to-peer connections among the group of distributed computing devices 130a-130g at a second time, according to one embodiment. The distributed computing devices 130a-130g have formed the connections in a different configuration from the connections 400 shown in FIG. 4A. For example, distributed computing device 130a is now connected to distributed computing device 130b over connection 460. The distributed computing devices 130a-130g continue to form new sets of connections and exchange data until they determine that distributed average consensus is reached.

In some embodiments, process replication is used to ensure that the loss of a distributed computing device 130 does not compromise the results of an entire computation task. Process replication provides a safeguard to the inherently unreliable nature of dynamic networks, and offers a mechanism for distributed computing devices 130 to check that peers computing devices 130 are indeed contributing to the calculation in which they are participating. In such embodiments, distributed computing devices 130 can be arranged into groups that are assigned the same data. When a group of distributed computing devices 130 assigned the same data reach a checkpoint, each computing device in the group of distributed computing devices can ensure that no other computing device in the group has cheated by hashing its current result (which should be the same across all computing devices in the group) with a piece of public information (such as a process ID assigned to the computing device), and sharing this with the group of computing devices. One or more computing devices in the group can check the current results received from other computing devices in the group to confirm that the other computing devices are participating and have obtained the same result.

Mathematical Theory of Distributed Average Consensus (DAC)

The distributed average consensus (DAC) algorithm is used in conjunction with a calculation in which a number of agents (e.g., N distributed computing devices 130), referred to as $N_{process}$ agents, must agree on their average value. The continuous time model for the local agent state governed by the DAC algorithm is given by the feedback model:

$$\dot{x}_i(t) = u_i(t)$$

$$x_i \in \mathbb{R}^n$$

$$i \in \{1, \ldots, N_{process}\} \quad (1)$$

where $x_i(t)$ is the numerical state of process i at time t, $\dot{x}_i(t)$ is the time derivative of the state, and $u_i(t)$ represents a particular consensus feedback protocol.

For illustrative purposes, a Nearest Neighbor protocol is used as the consensus feedback protocol:

$$u_i(t) = \Sigma v_j \in \mathcal{N}_i \, (x_j(t) - x_i(t)) \quad (2)$$

where $\mathcal{N}_i$ is the neighbor set of process i.

The global system can be written as the following dynamical system of the equations:

$$\dot{x}_i(t) = -Lx(t)$$

$$x_i \in \mathbb{R}^{nN_{process}}$$

$$L \in \mathbb{R}^{nN_{process} \times nN_{process}} \quad (3)$$

where L is the graph Laplacian matrix.

In the case of a connected network, the unique and universally convergent equilibrium state of this system is as follows:

$$x_i(\infty) = \frac{1}{N_{process}} 1^T x(0) \quad (4)$$

where $1^T \in \mathbb{R}^{nN_{process}}$ is a vector of all ones. This result means that the agents in the network (e.g., the distributed computing devices 130) not only come to an agreement on a value, but a particular unique value: the average of the initial conditions of the agents on the network.

The rate at which $x_i(t)$ converges to $x_i(\infty)$ for this protocol is proportional to the smallest nonzero eigenvalue of the system Laplacian matrix L. Furthermore, the equilibrium state can be attained under dynamic, directional topologies with time delays. This notion of consensus is suitable for a distributed protocol since each process requires communication only with a set of neighboring processors, and there is no need for a fusion center or centralized node with global information. It is in this sense that consensus can be exploited in the distributed computing environment 100 to achieve a variety of useful tools for distributed computing, such as multi-agent estimation and control. Distributed consensus is particularly advantageous for performing reductions on distributed data because it bypasses the need for sophisticated routing protocols and overlay topologies for complicated distributed networks.

In order for each distributed computing device 130 to gauge its proximity to the global average and, based on the proximity, determine when to terminate the DAC algorithm, the distributed computing devices 130 compute a convergence indicator after each set of connections (e.g., after forming the set of connections shown in FIG. 4A or 4B). The convergence indicator can be represented geometrically, e.g., as a circle, sphere, or hypersphere, or, more generally, an n-sphere. An n-sphere is a generalization of a sphere to a space of arbitrary dimensions; for example, a circle is a 1-sphere, and an ordinary sphere is a 2-sphere. The distributed computing devices 130 can be assigned initial portions of the geometric structure, each having a center of mass. During each iteration of the DAC algorithm, each distributed computing device 130 exchanges with at least one neighboring distributed computing device two pieces of data: the distributed computing device's current $x_i(t)$, and the distributed computing device's current mass and position in the convergence indicator. Each distributed computing device 130 averages its $x_i(t)$ with the received $x_j(t)$ received from its neighbor to calculate $x_i(t+1)$; similarly, each distributed computing device 130 combines its center of mass with its neighbor's to determine a new center of mass. When the exchanges lead to the convergence indicator becoming sufficiently close to the global center of mass of the geometric structure, the DAC algorithm terminates, and the last $x_i$ can be used to calculate the final result of the computation task. A given distance from the center of mass of the geometric structure can be defined as a convergence threshold for determining when the process has converged. If the convergence process does not reach the center of mass of the geometric structure, this indicates that at least one distributed computing device 130 did not participate in the calculation.

Figures 5A, 5B:
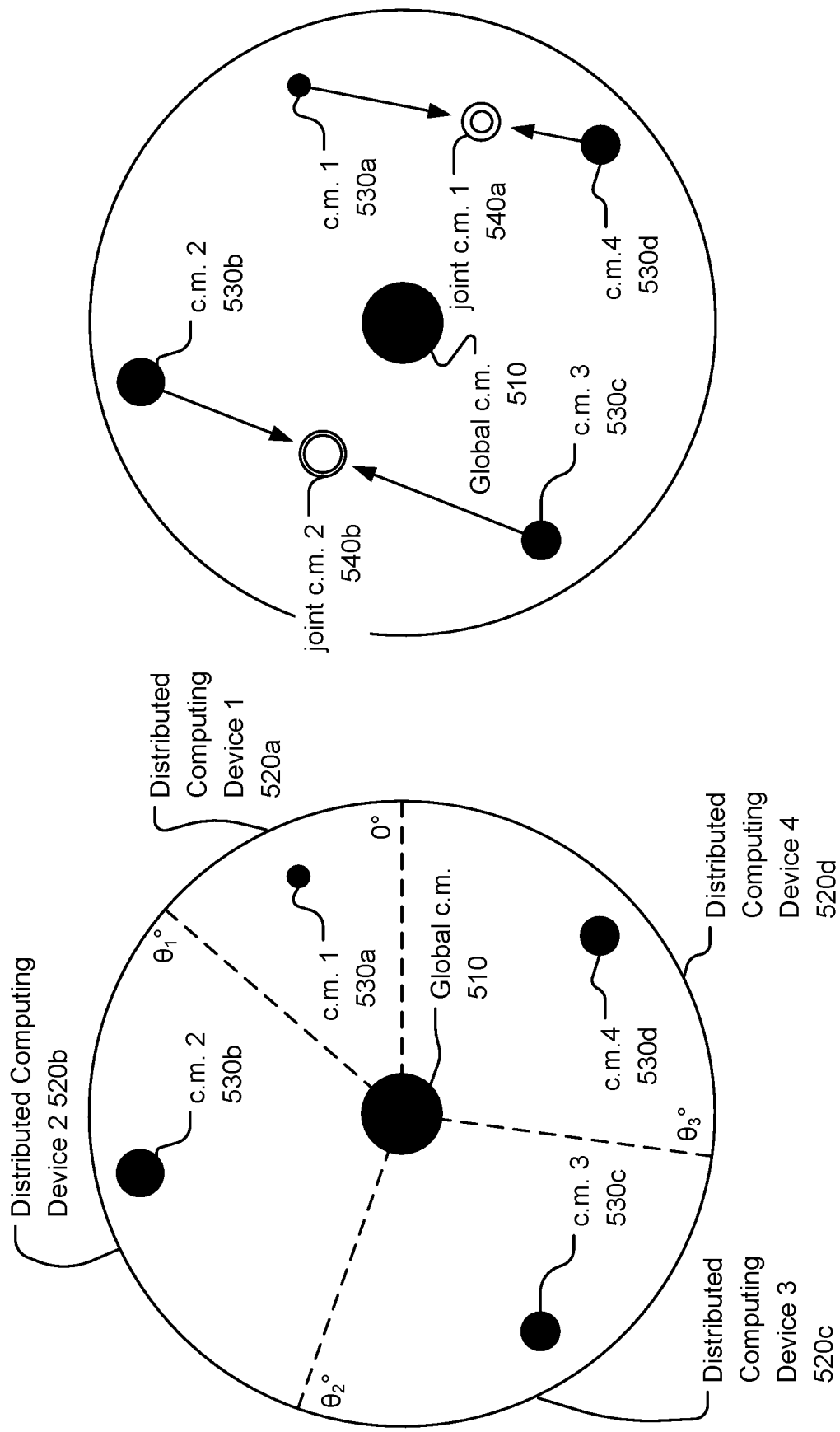
FIG. 5A is a graphical illustration of an initialized distributed average consensus convergence indicator, according to one embodiment.
FIG. 5B is a graphical illustration of a first peer-to-peer update in a distributed average consensus convergence indicator, according to one embodiment.

An exemplary convergence scheme based on a unit circle is shown in FIGS. 5A and 5B. FIG. 5A is a graphical illustration of an initialized distributed average consensus convergence indicator, according to one embodiment. In this example, the convergence indicator is a circle having a global center of mass (c.m.) 510. Each distributed computing device 130 that signed the smart contract 150 is assigned a random, non-overlapping portion of an arc on a circle, e.g., a unit circle. For example, the smart contract scheduler 120, the requesting computing device 110, or one of the distributed computing devices 130 may determine and assign arcs to the participating distributed computing devices 130. In the example shown in FIG. 5A, a first portion of the arc between 0° and $\theta_1$° is assigned to a distributed computing device 1 520a. Three additional portions of the circle are assigned to three additional distributed computing devices 520b-520d. The distributed computing devices 520 are embodiments of the distributed computing devices 130 described above. As shown in FIG. 5A, the arcs are not of equal size; for example, the arc assigned to distributed computing device 1 520a is smaller than the arc assigned to distributed computing device 2 520b. Each distributed computing device 520 computes the center of mass (c.m.) 530 of its unique arc, including both the mass and location of the center of mass. The differing masses are represented in FIG. 5A as different sizes of the centers of mass 530; for example, the circle around c.m. 1 530a is smaller than the circle around c.m. 2 530b, because the portion assigned to distributed computing device 1 520a is smaller than the portion assigned to distributed computing device 2 520b and therefore has a smaller mass.

After each successful connection (e.g., after the distributed computing devices 520 form the first set of peer connections shown in FIG. 4A or the second set of peer connections shown in FIG. 4B), each distributed computing device updates the location of its c.m. relative to the c.m. of the distributed computing device to which it connected and exchanged data. FIG. 5B is a graphical illustration of a first peer-to-peer update in the distributed average consensus convergence indicator shown in FIG. 5A. In this example, distributed computing device 1 520a has connected to distributed computing device 4 520d, and distributed computing device 2 520b has connected to distributed computing device 3 520c. Each set of connecting distributed computing devices exchange their respective centers of mass and calculate a joint center of mass. For example, distributed computing devices 1 and 4 calculate the joint c.m. 1 540a based on the locations and masses of c.m. 1 530a and c.m. 4 530d. As shown, joint c.m. 1 540a is partway between c.m. 1 530a and c.m. 4 530d, but closer to c.m. 4 530d due to its larger mass.

As described with respect to FIGS. 4A and 4B, the distributed computing devices 520 continue forming different sets of connections. This iterative procedure of connecting, exchanging, and updating continues until the distributed computing devices 520 reach a center of mass that is within a specified distance of the global center of mass 510, at which point the distributed computing devices 520 terminate the consensus operation. The specified distance from the global center of mass 510 for stopping the iterative procedure may be a specified error tolerance value, e.g., 0.0001, or $1\times10^{10}$. If the distributed computing devices 520 do not reach the global center of mass 510, this indicates that at least one distributed computing device did not participate in the consensus mechanism. For example, if one distributed computing device did not participate in consensus, the center of mass determined by the DAC procedure is pulled away from that distributed computing device's portion of the arc, because that distributed computing device, represented by its assigned mass, did not contribute to DAC procedure. The distributed computing devices 520 may perform the iterative procedure a particular number of times before stopping even if convergence is not reached. The number of iterations to attempt convergence may be based on the number of distributed computing devices participating in the DAC process. Alternatively, the distributed computing devices may perform the iterative procedure until the center of mass becomes stationary, e.g., stationary within a specified threshold.

If multiple distributed computing devices do not participate in consensus, it may be difficult to identify the non-participating computing devices from a circular structure. Therefore, in some embodiments, a higher dimensional shape is used as the convergence indicator, such as a sphere or a hypersphere. In such embodiments, each distributed computing device is assigned a higher-dimensional portion of the shape; for example, if the convergence indicator is a sphere, each distributed computing device is assigned a respective section of the sphere. Using a higher number of dimensions for a higher number of distributed computing devices involved in a computation task (e.g., N dimensions for N distributed computing devices) can ensure that the non-participating distributed computing devices are identified.

Example Applications of Distributed Average Consensus (DAC)

The DAC algorithm can be used to perform a dot product calculation. The dot product is one of the most important primitive algebraic manipulations for parallel computing applications. Without a method for computing distributed dot products, critical parallel numerical methods (such as conjugate gradients, Newton-Krylov, or GMRES) for simulations and machine learning are not possible. The DAC algorithm, described above, can be used to perform a dot product of two vectors x and y, represented as $x^Ty$, in a distributed manner by assigning distributed computing devices 130 to perform respective local dot products on local sub-vectors, and then having the distributed computing devices 130 perform consensus on the resulting local scalar values. After consensus is reached, the result of the consensus on the scalar values is multiplied by the number of processes in the computation. The relationship between the dot product $x^Ty$ of two vectors of length n and the average of the local scalar calculations $x_iy_i$ is as follows:

$$x^Ty = x_1y_1 + \cdots + x_ny_n = n\left(\sum_{i=1}^{n} \frac{x_iy_i}{n}\right) \quad (5)$$

Figure 6:
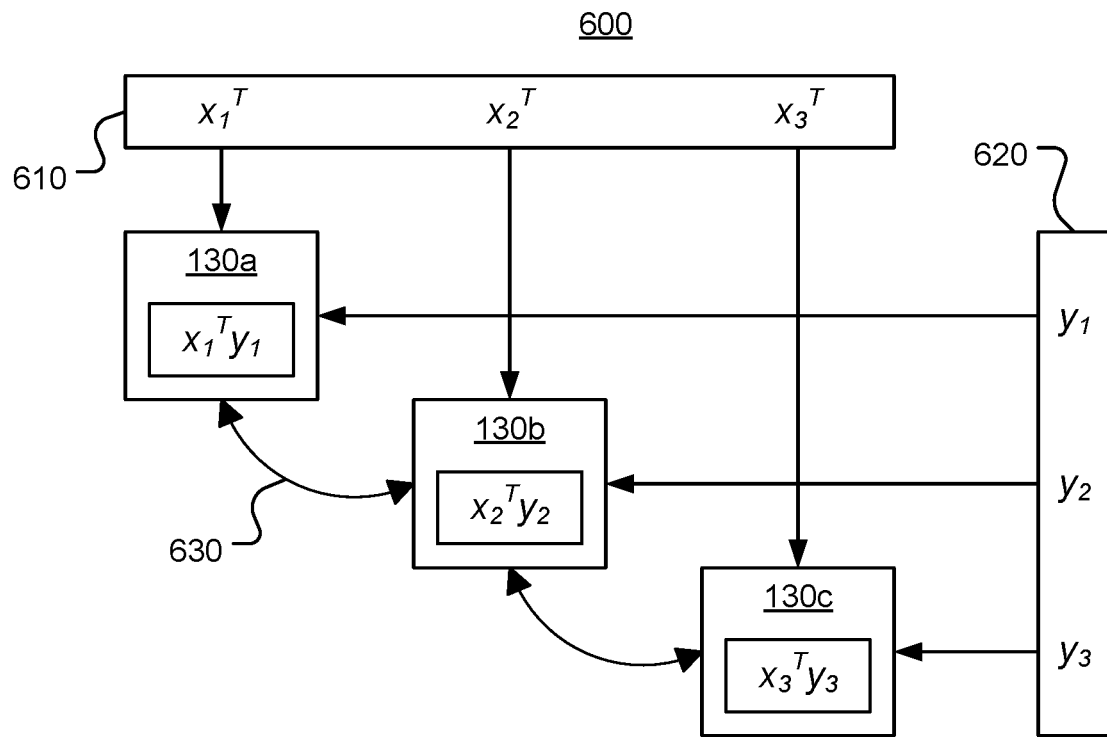
FIG. 6 illustrates an example of using distributed computing devices to perform a distributed dot product calculation, according to one embodiment.

FIG. 6 illustrates an example 600 of using three distributed computing devices to perform a distributed dot product calculation, according to one embodiment. In FIG. 6, a first vector x 610 is partitioned into three sub-vectors, $x_1^T$, $x_2^T$, and $x_3^T$. A second vector y 620 is also partitioned into three sub-vectors, $y_1$, $y_2$, and $y_3$. A first distributed computing device 130a receives the first vector portions $x_1^T$ and $y_1$ and calculates the dot product $x_1^T y_1$. Second and third distributed computing devices 130b and 130c calculate dot products $x_2^T y_2$ and $x_3^T y_3$, respectively. The distributed computing devices 130a-130c exchange the dot products via connections 630 and calculate averages, as described above, until consensus is reached. After consensus, the average dot product is multiplied by the number of participating distributed computing devices 130 (in this example, 3) to determine $x^T y$.

The DAC algorithm can be performed on scalar quantities, as shown in the dot product example, and on vector quantities. In a second example, the DAC algorithm is used to perform a distributed matrix-vector product calculation. Distributed matrix-vector products are essential for most iterative numerical schemes, such as fixed point iteration or successive approximation. To calculate a matrix-vector product, a matrix is partitioned column-wise, and each distributed computing device 130 receives one or more columns of the global matrix. A local matrix-vector product is calculated at each distributed computing device 130, and average consensus is performed on the resulting local vectors. The consensus result is then multiplied by the number of distributed computing devices 130 in the computation.

Figure 7:
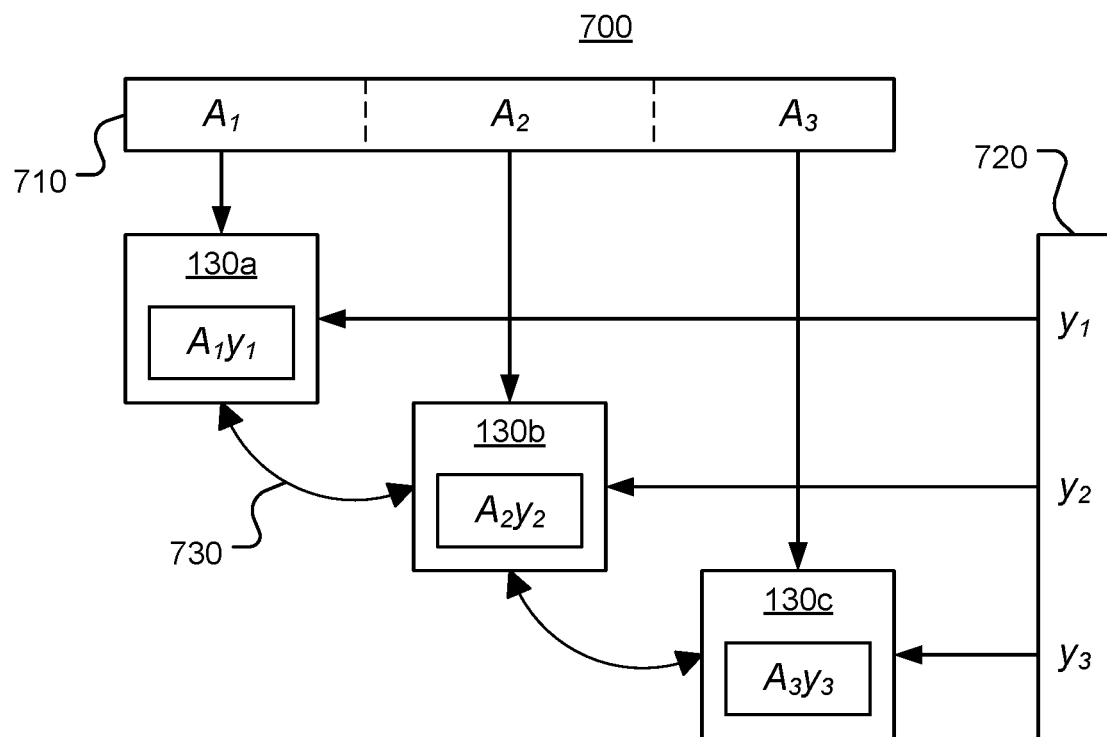
FIG. 7 illustrates an example of using distributed computing devices to perform a distributed matrix-vector product calculation, according to one embodiment.

FIG. 7 illustrates an example 700 of using three distributed computing devices to perform a distributed matrix-vector product calculation, according to one embodiment. In FIG. 7, a first matrix A 710 is partitioned column-wise into three sub-matrices, $A_1$, $A_2$, and $A_3$. A vector y 720 is partitioned into three sub-vectors, $y_1$, $y_2$, and $y_3$. The first distributed computing device 130a receives the first matrix portion $A_1$ and the first vector portion $y_1$ and calculates the matrix-vector product $A_1 y_1$. The second and third distributed computing devices 130b and 130c calculate the matrix-vector products $A_2 y_2$ and $A_3 y_3$, respectively. The distributed computing devices 130a-130c exchange the matrix-vector products via connections 730 and calculate averages, as described above, until consensus is reached. After consensus, the average matrix-vector product is multiplied by the number of participating distributed computing devices 130.

As another example, the DAC algorithm is used to calculate a distributed least squares regression. Least squares is one of the most important regressions used by scientists and engineers. It is one of the main numerical ingredients in software designed for maximum likelihood estimation, image reconstruction, neural network training, and other applications. The problem of finding the least-squares solution to an overdetermined system of equations can be defined as follows:

$$Ax=b$$

$$A \in \mathbb{R}^{(n \cdot N_{process}) \times M} \quad (6)$$

In the above equations, A is a sensing matrix, x is the least-squares solution vector, and b is a target vector. The solution to this problem is given by the pseudo inverse, as follows:

$$x=(A^T A)^{-1} A^T b \quad (7)$$

In some embodiments of parallel computing applications, the sensing matrix, A, is distributed row-wise and the least-squares solution, x, is solved for locally on each computational node since the local least-squares solutions, or components of the least-squares solutions (e.g., local components for $A^T b$ and $A^T A$) are small in comparison to the total number of measurements. This means that each distributed computing device 130 in the network owns a few rows (e.g., measurements) of the sensing matrix A and the target vector b. The least squares solution x for the system can be recovered from the local least-squares solutions using the DAC algorithm. The portions of the sensing matrix and target vector owned by a given distributed computing device i are represented as $A_i$ and $b_i$, respectively. Each distributed computing device i calculates the products $A_i^T b_i$ and $A_i^T A_i$ and stores these products in its local memory. DAC is then performed on these quantities, which both are small compared to the total number of observations in A. The results of the DAC process are $$\frac{1}{n}\sum_{i=1}^{n} A_i^T A_i \text{ and } \frac{1}{n}\sum_{i=1}^{n} A_i^T b_i,$$

which are present at every distributed computing device at the end of the DAC process. These quantities are multiplied by the number n of processes in the computation, so that every distributed computing device has copies of $A^T b$ and $A^T A$ that can be used to locally obtain the least squares fit to the global data set.

Figure 8:
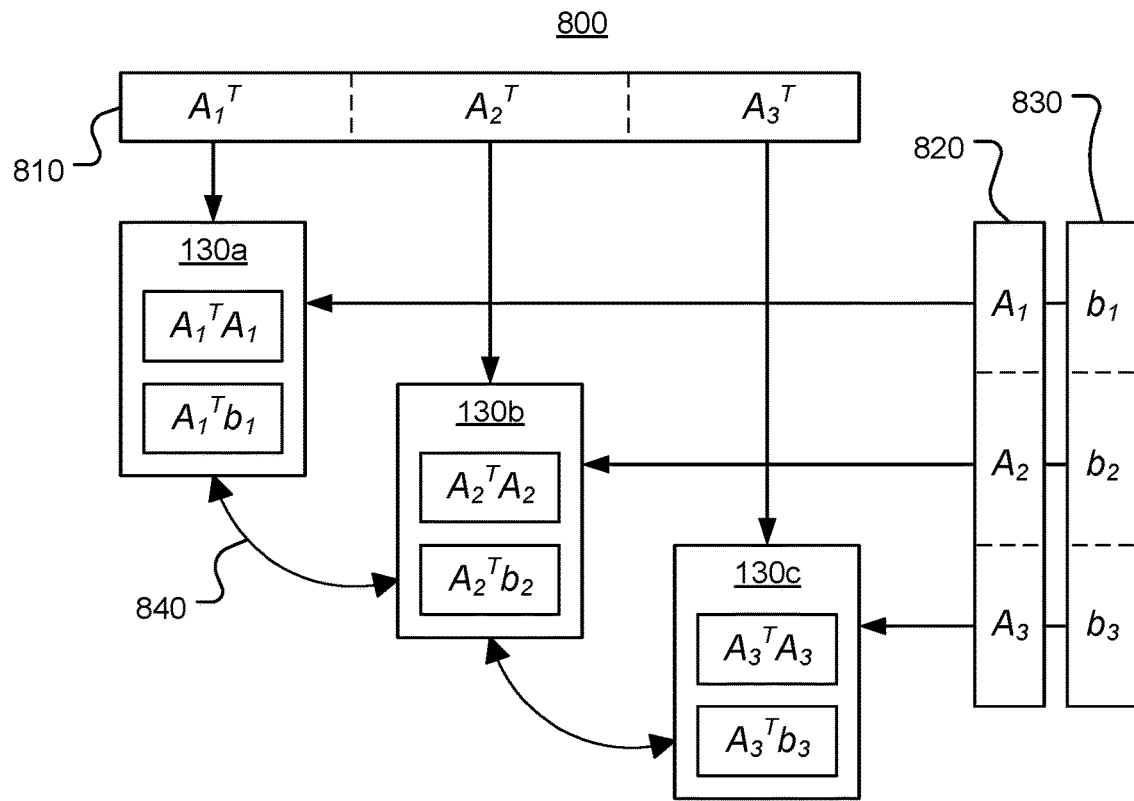
FIG. 8 illustrates an example of using distributed computing devices to perform a distributed least squares calculation, according to one embodiment.

FIG. 8 illustrates an example 800 of using three distributed computing devices to perform a distributed least squares calculation, according to one embodiment. In FIG. 8, the transpose of the sensing matrix $A^T$ 810 is partitioned column-wise into three sub-matrices, $A_1^T$, $A_2^T$, and $A_3^T$. The sensing matrix A 820 is partitioned row-wise into three sub-matrices, $A_1$, $A_2$, and $A_3$. Each distributed computing device 130a-130c calculates a respective matrix-matrix product $A_1^T A_1$, $A_2^T A_2$, and $A_3^T A_3$. In addition, each distributed computing device 130a-130c has a respective portion of the target vector b 830 and calculates a respective matrix-vector product $A_1^T b_1$, $A_2^T b_2$, and $A_3^T b_3$, similar to the calculation shown in FIG. 7. The distributed computing devices 130a-130c exchange the matrix-matrix products and matrix-vector products via connections 840 and calculate averages of these products, as described above, until consensus is reached. After consensus, the average matrix-matrix product and average matrix-vector product are multiplied by the number of participating distributed computing devices 130, and the results are used to calculate the least square solution x.

As another example, the DAC algorithm can be applied to decentralized Bayesian parameter learning. Many industrial applications benefit from having a data-driven statistical model of a given process based on prior knowledge. Economic time series, seismology data, and speech recognition are just a few big data applications that leverage recursive Bayesian estimation for refining statistical representations. DAC can be used to facilitate recursive Bayesian estimation on distributed data sets.

In an exemplary decentralized Bayesian parameter learning process, each distributed computing device attempts to estimate a quantity, x, via a probability distribution, $p(x)=p(x|y_{1:n})$. Each distributed computing device $i \in \{1, \ldots n\}$ makes an observation, $y_i$, that is related to the quantity of interest through a predefined statistical model $\mu_i(y_i, x)$. Under mild conditions, the Bayesian estimate of x is proportional to:

$$\pi(x) \propto \pi_0(x) \Pi_{i=1:n} \mu_i(y_i, x) \quad (8)$$

where $\pi_0(x)$ is the prior distribution based on past knowledge. The posterior estimate, $\pi(x)$, conditional on the distributed measurements can be computed using the DAC approach by rewriting the product term in equation 8 in the form of an average quantity:

$$\pi(x) \propto \pi_0(x) \exp\left(\frac{1}{n} \Sigma_{i=1:n} \ln(\mu_i(y_i, x))\right)^n \quad (9)$$

Leveraging DAC to compute the global average of the distributed measurement functions allows each distributed computing device to consistently update its local posterior estimate without direct knowledge or explicit communication with the rest of the global data set.

Figure 9:
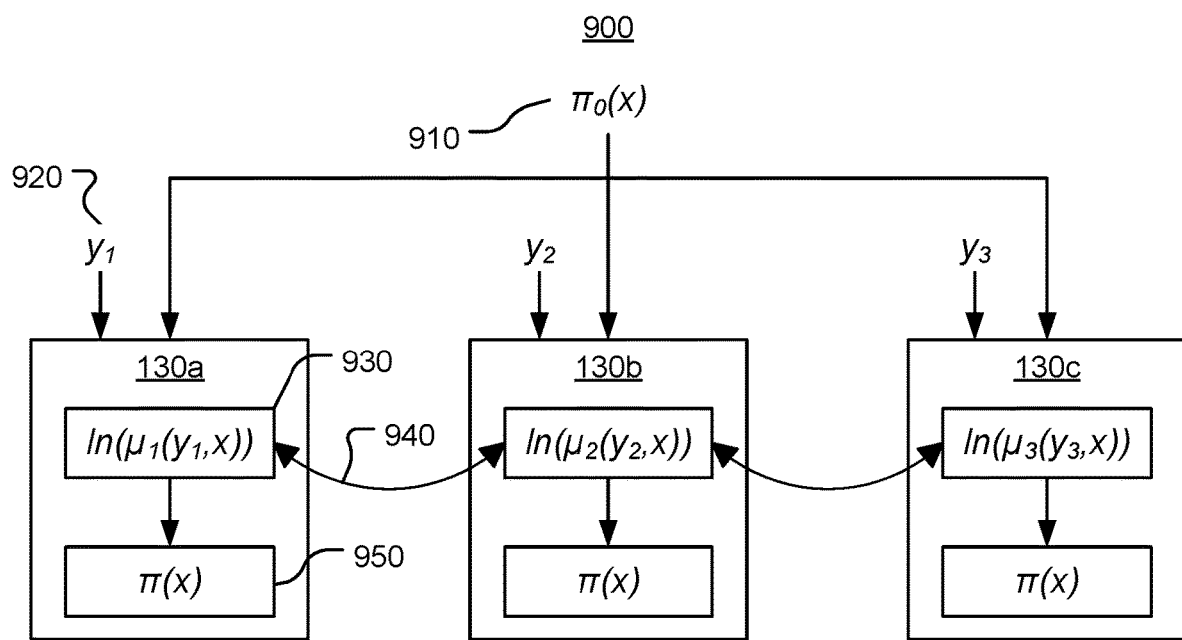
FIG. 9 illustrates an example of using distributed computing devices to perform decentralized Bayesian parameter learning, according to one embodiment.

FIG. 9 illustrates an example 900 of using three distributed computing devices to perform decentralized Bayesian parameter learning, according to one embodiment. In FIG. 9, each distributed computing device 130 receives or calculates the prior distribution $\pi_0(x)$ 910. In addition, each distributed computing device 130a makes or receives a respective observation or set of observations $y_i$; for example, distributed computing device 130a receives the observation $y_1$ 920. Based on the prior distribution $\pi_0(x)$ and observation $y_1$, each distributed computing device 130a-130c calculates the quantity $\ln(\mu_i(y_i, x))$; for example distributed computing device 130 calculates $\mu_1(y_1, x)$ 930. The distributed computing devices 130a-130c exchange the calculated quantities via connections 940 and calculate averages, as described above, until consensus is reached. After consensus, the distributed computing devices 130 use the average of the quantity $\ln(\mu_i(y_i, x))$ to calculate the posterior estimate, $\pi(x)$ 950, according to equation 9.

While four example calculations described shown in FIGS. 6-9 each are shown in distributed environments with three computing devices, it should be understood that the calculations can be performed using larger sets of distributed computing devices. In addition, the DAC method can be used for other types of calculations that involve calculating an average, e.g., any type of calculation from which a higher result can be obtained from an average.

Figure 10:
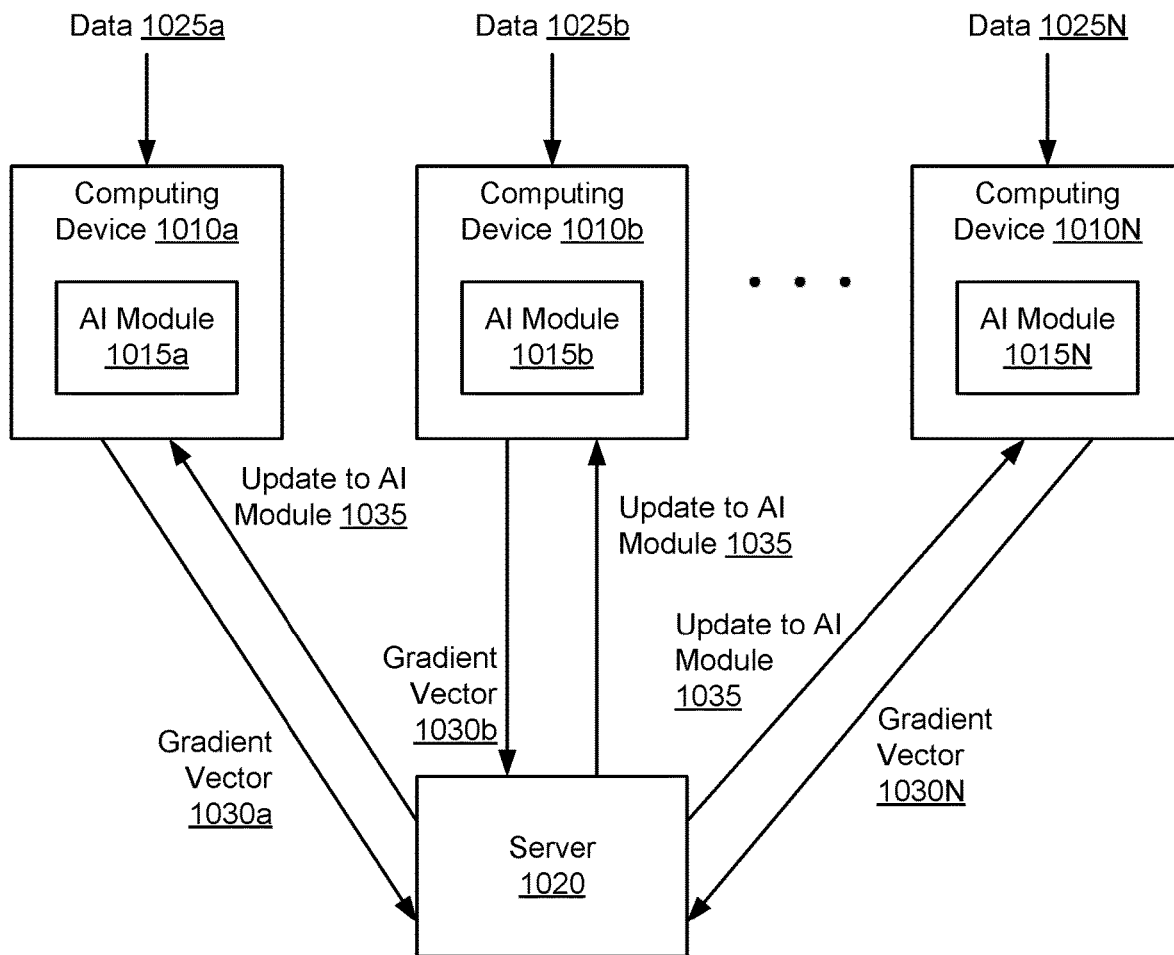
FIG. 10 is a flow diagram illustrating a prior art procedure for training an artificial intelligence (AI) model.

Using Distributed Average Consensus (DAC) to Train an Artificial Intelligence Model In prior systems for improving artificial intelligence (AI) models using data collected in a distributed manner, a "gather and scatter" method was used to generate and propagate updates to the AI models based on collected data. FIG. 10 shows an exemplary prior art system 1000 performing the gather and scatter method for training an AI model. As shown in FIG. 10, a number N of computing devices 1010, referred to as computing device 1010a through computing device 1010N, are connected to a server 1020. Each computing device 1010 includes an AI module 1015. Each AI module 1015 can include, among other things, an AI model (such as a neural network) for making one or more predictions based on input data, e.g., data 1025 collected or received by the computing device 1010. In this example, each AI module 1015 is also configured to generate a gradient descent vector 1030 based on the received data; the gradient descent vectors 1030a-1030N are used to train the AI model. Each gradient descent vector 1030 calculated by each AI module 1015 is transmitted by each computing device 1010 to the server 1020; for example, computing device 1010a transmits gradient descent vector 1030a to the server 1020. Based on all of the received gradient descent vectors 1030a-1030N, the server 1020 optimizes and updates the AI model, and based on the updated AI model, the server 1020 transmits an update to the AI module 1035 to each of the computing devices 1010a-1010N.

The gather and scatter method requires a central server 1020 to manage the process of updating the AI model. The server 1020 must be reliable, and each computing device 1010 must have a reliable connection to the server 1020 to receive updates to the AI model. The processing performed by the server 1020 on the gradient vectors 1030a-1030N to generate the update 1030 can require a large amount of computing and storage resources, especially if the number of computing devices N is large and/or the gradient vectors 1030 are large. Further, the gather and scatter method does not take advantage of the computing resources available on the computing devices 1010a-1010N themselves.

Figure 11:
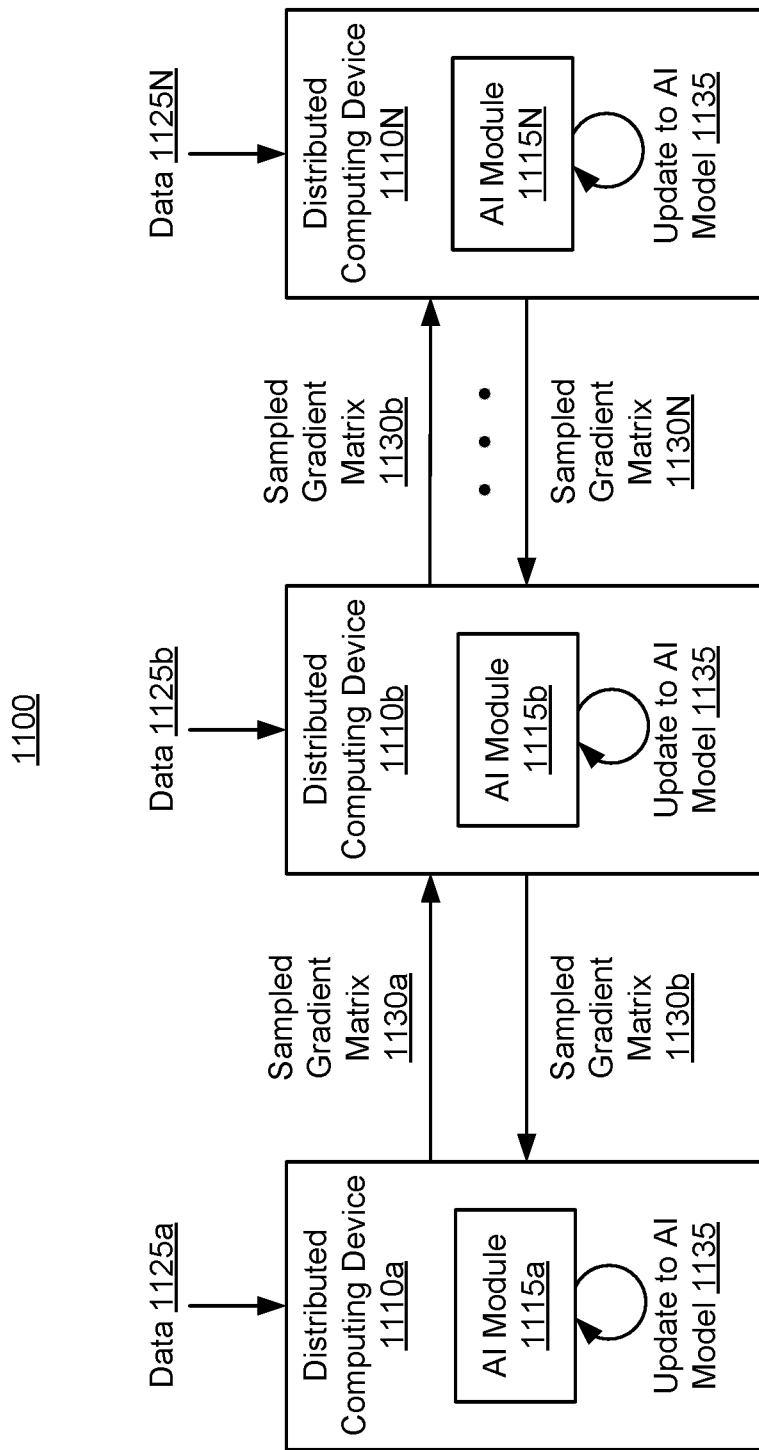
FIG. 11 is a flow diagram illustrating a procedure for training an artificial intelligence (AI) model using distributed average consensus, according to one embodiment.

FIG. 11 illustrates a system 1100 for training an artificial intelligence (AI) model using distributed average consensus, according to one embodiment. FIG. 11 includes a number N of distributed computing devices 1110, referred to as distributed computing device 1110a through distributed computing device 1110N. The distributed computing devices 1100 may be embodiments of the distributed computing devices 130 described above. Each distributed computing device 1110 receives respective data 1125. For example, distributed computing device 1110a receives data 1125a, distributed computing device 1110b receives data 1125b, and so on. The respective data 1125 received by two different distributed computing devices may be different; for example, data 1125a may be different from data 1125b. The data 1125 may be structured as sets of training pairs including one or more data inputs paired with one or more labels. The data 1125 may be generated internally by the distributed computing device 1110, received from one or more sensors within or connected to the distributed computing device 1110, received from one or more users, received from one or more other distributed computing devices, or received from some other source or combination of sources.

Each distributed computing device 1110 includes an AI module 1115. The AI module 1115 includes an AI model for processing one or more input signals and making predictions based on the processed input signals. For example, the AI model may be a neural network or other type of machine learning model. In addition, each AI module 1115 is configured to train the AI model based on the data 1125 received by the set of distributed computing devices 1110. The AI modules 1115 of different distributed computing devices 1110 may be functionally similar or identical. In general, the AI module 1115 generates data for optimizing the AI model based on its respective received data 1125, compresses the generated data, and exchanges the compressed data with the compressed data generated by other AI modules 1115 of other distributed computing devices 1110. The AI modules 1115 execute a convergence algorithm, such as the distributed average consensus (DAC) algorithm described above, on the exchanged compressed data to obtain a consensus result for optimizing the AI model. Each respective AI module 1115 updates its local AI model based on the consensus result.

In some embodiments, to generate the data used to optimize the AI model, each AI module 1115 is configured to compute a gradient descent vector for each training pair (e.g., one or more data inputs paired with one or more labels)

in the respective data 1125 received by the distributed computing device 1110 based on a locally-stored AI model. For example, the AI module 1115a of distributed computing device 1110a calculate a gradient descent vector for each training pair included in the data 1125a. The AI module 1115 is further configured to concatenate the gradient descent vectors to form a gradient descent matrix, and sample the gradient descent matrix to generate a sampled gradient matrix 1130, which is shared with the other distributed computing devices in a peer-to-peer fashion. For example, distributed computing device 1110b shares its sampled gradient matrix 1130b with both distributed computing device 1110a and distributed computing device 1110N, and receives the sampled gradient matrices 1130a and 1130N from distributed computing devices 1110a and 1110N, respectively. The distributed computing devices 1110 form various sets of connections, as described with respect to FIG. 4, and exchange sampled gradient matrices 1130 until the distributed computing devices 1110 reach consensus according to the DAC algorithm, as described above. In particular, after performing the DAC process, each distributed computing device 1110 has a local copy of a consensus gradient matrix.

The length and number of gradient descent vectors produced by an AI module 1115 can be large. While a single gradient descent vector or matrix (e.g., a gradient vector 1030 described with respect to FIG. 10, or a set of gradient descent vectors generated by one distributed computing device 1110) can be generated and stored on a single distributed computing device 1110, if the number of distributed computing devices N is large, a single distributed computing device 1110 may not be able to store all of the gradient descent vectors generated by the N distributed computing devices, or even the gradient descent vectors generated by a portion of the N distributed computing devices. In addition, transferring a large number of large vectors between the distributed computing devices 1110a-1110N uses a lot of communication bandwidth. To reduce the size of data transfers and the computational resources required for each distributed computing device 1110, the AI module 1115 samples each matrix of gradient descent vectors.

In addition, the distributed computing devices 1110a-1110N run a convergence algorithm on the exchanged data (e.g., the exchanged sampled gradient matrices) to determine whether a distributed average consensus (DAC) on the exchanged data has obtained by all of the distributed computing devices 1110a-1110N. For example, the distributed computing devices 1110a-1110N may perform distributed average consensus on sampled gradient descent matrices to obtain a global matrix of the same size as the sampled gradient descent matrices. When each distributed computing device 1110 has received some or all of the other sampled gradient matrices 1130, and a distributed average consensus has been achieved, each AI module 1115 generates its own update to the AI model 1135. The update 1135 may be an optimization of the weights of the AI model stored in the AI module 1115 based on the sampled gradient matrices 1130a-1130N, including the locally generated sampled gradient matrix and the matrices received from peer distributed computing devices.

As described above, the DAC process ensures that each distributed computing device 1110 has contributed to the coordinated learning effort undertaken by the distributed computing devices 1110a-1110N. The coordinated learning process runs without the need for a central server. In addition, because the distributed computing devices 1110a-1110N exchange sampled gradient matrices 1130a-1130N, rather than the underlying data 1125a-1125N, the privacy of the distributed computing devices 1110 and their users is maintained. For example, when distributed computing device 1110a receives the sampled gradient matrix 1130b from another distributed computing device 1110b, the distributed computing device 1110a cannot determine any personal information about the data 1125b collected by the distributed computing device 1110b from the received sampled gradient matrix 1130b.

In an example, the training of a neural network consists of specifying an optimization objective function, $\mathcal{F}: \mathbb{R}^{M_{in}} \to \mathbb{R}^+$, that is a function of both the network weights, $w \in \mathbb{R}^{N_w}$, (i.e. the network topology) and the available training data, $\{x_i \in \mathbb{R}^{M_{in}}, y_i \in \mathbb{R}^{M_{out}}\}_{i=1}^{N_x}$, where x represents the primal data, y represents the associated labels, and $N_x$ is the number of training examples. The goal of neural network training is to produce a predictive neural network by manipulating the weights w such that the expected value of the objective function $\mathcal{F}$ is minimized. This goal can be expressed as follows:

$$\text{minimize}_{w \in \mathbb{R}^{N_w}} \mathbb{E}[\mathcal{F}(x,y;w)] \qquad (10)$$

The method of gradient descent can be used to tune the weights of a neural network. Gradient descent involves the evaluation of the partial derivative of the objective function with respect to the vector of weights. This quantity is known as the gradient vector, and can be expressed as follows:

$$\frac{\partial \mathcal{F}(x, y; w)}{\partial w} \in \mathbb{R}^{N_w} \qquad (11)$$

A gradient vector can be computed for each training pair $(x_i, y_i)$ in the training set. As described above, the AI module 1115 computes a gradient vector for each training pair in the data 1125 received at each distributed computing device 1110.

To approximate the data set used for optimization, a cooperative subspace approach that combines the DAC process with the theory of random sampling can be used. A cooperative subspace is used to sample the gradient vectors (e.g., to form sampled gradient vectors 1130) so that the DAC process can be performed more efficiently. As an example, $A_i \in \mathbb{R}^{N \times k_i}$ represents the matrix of data that is local to a given distributed computing device 1110, referred to as node i, for i={1, . . . , $N_{nodes}$}, and A=[$A_1$, . . . , $A_{N_{nodes}}$]$\in \mathbb{R}^{N \times (k_i N_{nodes})}$ represents the global data set (i.e., the data 1125 received by the set of distributed computing devices 1110). The cooperative subspace approach computes, in a fully distributed fashion, a representative subspace, $U \in \mathbb{R}^{N \times q}$ that approximates the range of A such that $\|A-UU^T A\| \le \epsilon \|A\|$, where $\epsilon$ is a user specified tolerance on the accuracy of the approximation between 0 and 1.

Figure 12:
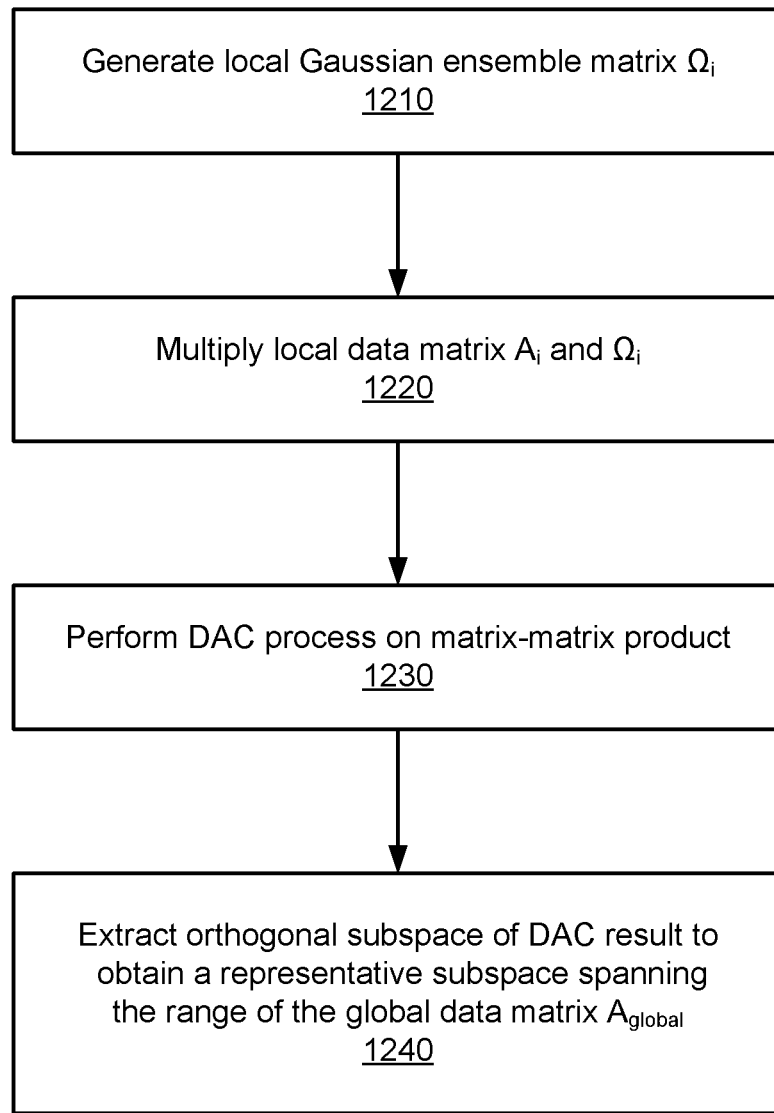
FIG. 12 is a flowchart showing a method for determining a consensus result within a cooperative subspace, according to one embodiment.

FIG. 12 is a flowchart showing a method 1200 for determining a consensus result within a cooperative subspace at a particular distributed computing device i, e.g., one of the distributed computing devices 1110. The distributed computing device 1110 generates 1210 a Gaussian ensemble matrix $\Omega_i \in \mathbb{R}^{k_i \times q}$. The Gaussian ensemble matrix is a matrix of random values used to sample a local data matrix $A_i$. For example, the local data matrix $A_i$ is the matrix of gradient descent vectors computed by the AI module 1115 of a given distributed computing device 1110 based on the data 1125 received by the distributed computing device 1110. Each distributed computing device 1110 generates its random matrix $\Omega_i$ independently. In other embodiments, other types of random matrices are used.

The distributed computing device 1110 multiplies 1220 its local data matrix $A_i$ of data local to the distributed computing device 1110 and its Gaussian ensemble matrix $\Omega_i$ to generate the matrix-matrix product $Y_i = A_i \Omega_i \in \mathbb{R}^{N \times q}$. The product $Y_i$ is an approximation of the data in the local data matrix $A_i$ and compresses the local data. While the full data matrix $A_{global}$ that includes the data from each distributed computing device 1110 may be too large to be stored on and manipulated by a single distributed computing device 1110, the sampled data matrix $Y_i$ is sufficiently small to be stored on and manipulated by a single distributed computing device 1110.

The distributed computing device 1110, in cooperation with the other distributed computing devices in the system, performs 1230 the DAC process on the sampled data matrices $Y_i$. The DAC process is performed according to the procedure described above. A convergence indicator, such as the convergence indicators described with respect to FIGS. 5A and 5B, may be used to determine when to terminate the DAC process. The DAC process produces a normalized global matrix-matrix product $Y_{global}$ on each node, which can be represented as follows:

$$Y_{Global} = \frac{1}{N_{nodes}} A [\Omega_1^T, \ldots, \Omega_{N_{nodes}}^T]^T \in \mathbb{R}^{N \times q} \quad (12)$$

During a first iteration of DAC process, a distributed computing device 1110 exchanges its sampled data matrix $Y_i$ with another distributed computing device 1110. For example, distributed computing device 1110a transmits the sampled gradient matrix 1130a to the distributed computing device 1110b, and receives sampled gradient matrix 1130b from distributed computing device 1110b. The distributed computing device 1110 calculates an average of its sampled data matrix $Y_i$ and the sampled data matrix received from the other distributed computing device. For example, the distributed computing device 1110 calculates an average of its sampled gradient matrix 1130a and the received sampled gradient matrix 1130b. This results in a consensus gradient descent matrix, which is a matrix of the same size as the sampled data matrix $Y_i$. In subsequent iterations, distributed computing devices 1110 exchange and average their current consensus gradient descent matrices. The consensus gradient descent matrices are repeatedly exchanged and averaged until a consensus result for the consensus gradient descent matrix is reached across the distributed computing devices 1110. The consensus result, which is the matrix $Y_{global}$, is obtained when the consensus gradient descent matrices are substantially the same across all the distributed computing devices 1110, e.g., within a specified margin of error. The convergence indicator described with respect to FIGS. 5A and 5B may be used to determine when $Y_{global}$ has been obtained, and to determine whether all distributed computing devices 1110 participated in determining the consensus result.

After calculating $Y_{global}$, the distributed computing device 1110 extracts 1240 the orthogonal subspace that spans the range of $Y_{global}$ via a local unitary decomposition, i.e., $Y_{Global} = UR$. Following the decomposition, the distributed computing device 1110 (and each other distributed computing device in the system) holds a copy of the representative subspace, $U \in \mathbb{R}^{N \times q}$, that approximately spans the range of the global data matrix $A_{global}$.

In the context of training an AI model, each distributed computing device in the network computes the local gradients associated with its local data set, producing the gradient vectors $$\frac{\partial \mathcal{F}(x, y; w)}{\partial w}\bigg|_i.$$

This gradient vector data is used to form the local data matrix $A_i$ in the cooperative subspace algorithm 1200. The gradient vectors are compressed into a suitably low dimensional subspace according to steps 1210 and 1220, the sampled, global gradient descent vectors are obtained according to the DAC process (step 1230), and gradient descent is performed in the global subspace locally on each agent (step 1240). The AI module 1115 updates its AI model (e.g., by updating the model weights) based on the representative subspace U, which reflects the data 1125 gathered by all of the distributed computing devices 1110.

While algorithms described herein are applied to optimizing a neural network, it should be understood that the algorithms can be applied to any type of machine learning. For example, other optimization techniques for improving machine learned models may be used, such as simulated annealing, nonlinear conjugate gradient, limited-memory BFGS, etc. In addition, other types of machine learning models can be used, such as capsule networks, Bayesian networks, genetic algorithms, etc.

Using Distributed Average Consensus (DAC) for Latent Semantic Indexing

As described above, in prior implementations for text-based searching using latent semantic indexing (LSI), a centralized system analyzes documents to determine their latent semantic content. The centralized system stores data describing these documents, receives searches from users, compares the search information to the stored data, and provides relevant documents to users. The centralized system must have access to the documents themselves in order to analyze them. Thus, the centralized system collects and analyzes a significant amount of data. The centralized system may also track users' searches to learn about individual users. Content providers would prefer to provide access to documents without having the documents scraped and analyzed by a search service, and users would prefer to search without a central system collecting and storing data about their behavior.

As disclosed herein, to generate a latent semantic index and enable searching in a distributed manner, a set of cooperating distributed computing devices according to embodiments herein use a cooperative subspace approach that combines the DAC algorithm described above with the theory of random sampling. Each cooperating distributed computing device stores one or more documents, and the documents distributed across the set of cooperating distributed computing devices are jointly referred to as a corpus of documents. The documents in the corpus may be documents that their respective users plan to make available for searching by other distributed computing devices, e.g., documents that can be searched by some or all of the cooperating distributed computing devices and/or other devices.

The cooperating distributed computing devices jointly generate a latent semantic index based on the corpus of documents, without the contents of any individual document being exposed to other distributed computing devices. First, each distributed computing device individually analyzes its locally-stored documents, and randomly samples the results of this analysis to generate a matrix that approximates and obscures the content of the local documents. The distributed computing devices share their matrices and perform the DAC algorithm described above to generate a matrix reflecting the corpus of documents stored by of all cooperating distributed computing devices. Each distributed computing device then extracts a low-dimension latent semantic index (LSI) subspace from the matrix based on the DAC result. This LSI subspace reflects the analysis of all of the documents in the corpus, but is much smaller than a matrix concatenating the raw analysis results of the local documents. The cooperative subspace approach allows the subspace to be calculated efficiently, and the random sampling obscures the underlying documents so that privacy is maintained.

The LSI subspace generated through this approach can be used for various applications. For example, one distributed computing device can search for documents on other distributed computing devices using the LSI subspace. The searching distributed computing device receives a search request that may include, for example, one or more keywords (i.e., a keyword search) or one or more documents (e.g., for a search for similar documents). The searching device represents the received search request in the subspace and transmits the representation of the search request to the cooperating distributed computing devices, or some other set of searchable devices. Each distributed computing device being searched compares the received representation of the search request to representations of the distributed computing device's local documents in the same subspace. If a distributed computing device being searched finds a document similar to the search request, the distributed computing device returns the document, or information about the document, to the searching device. A corpus can be constructed, and a search performed, on any type of text-based document. For example, a subspace constructed from a corpus of resumes can be used to conduct a hiring search, or a subspace constructed from a corpus of dating profiles can be used to implement a dating service.

Figure 13:
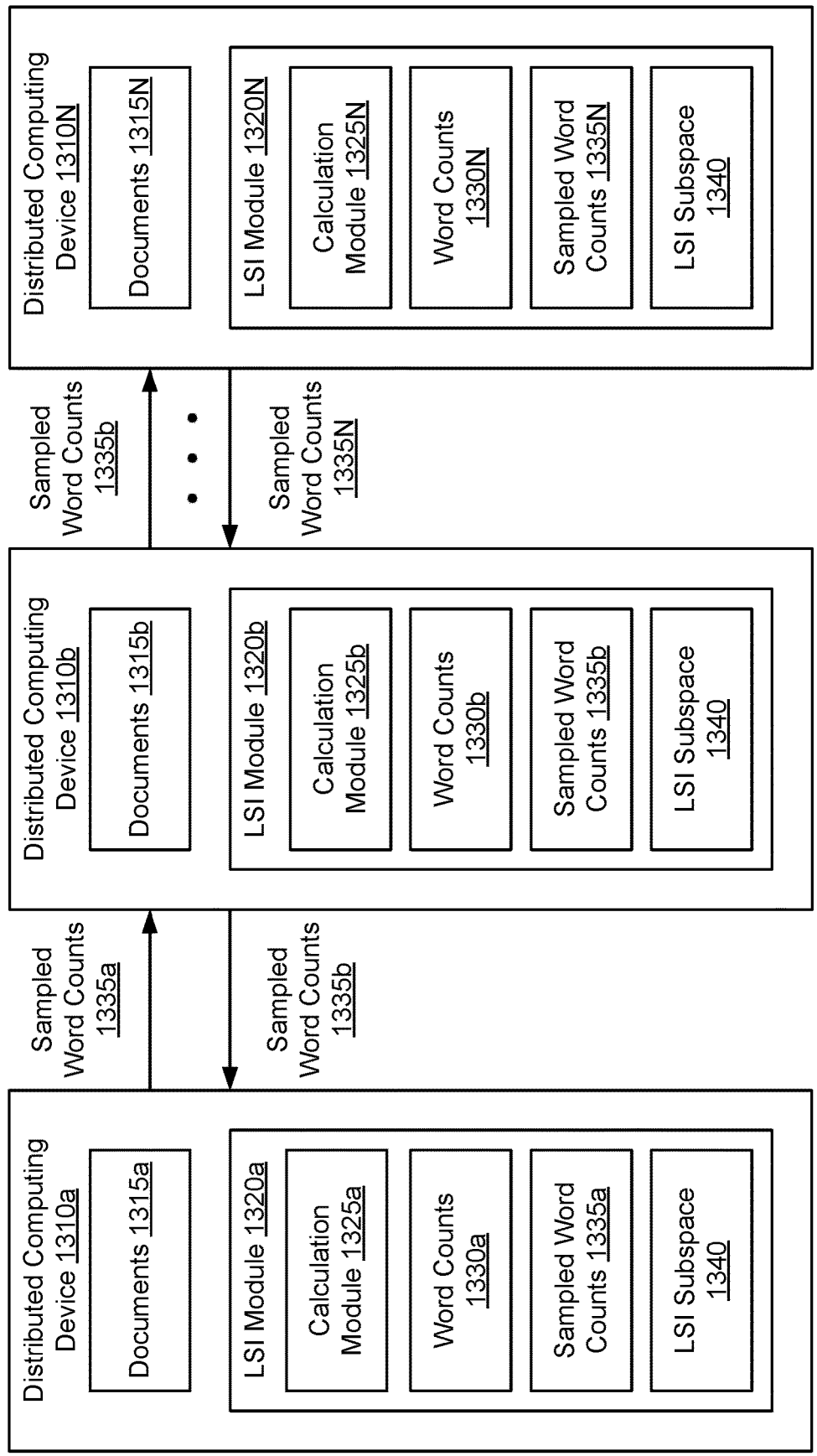
FIG. 13 is a flow diagram illustrating a distributed environment for generating a low-dimension subspace for latent semantic indexing, according to one embodiment.

FIG. 13 illustrates a distributed environment 1300 for generating a low-dimension subspace for latent semantic indexing, according to one embodiment. The environment 1300 includes a number N of distributed computing devices 1310, referred to as distributed computing device 1310a through distributed computing device 1310N. The distributed computing devices 1310 may be embodiments of the distributed computing devices 130 described above. Each distributed computing device 1310 includes a set of documents 1315 and a latent semantic indexing (LSI) module 1320.

The documents 1315 are any text-based or text-containing documents on or accessible to the distributed computing device 1310. In some embodiments, the documents 1315 are locally stored on the distributed computing device 1310. In other embodiments, the documents 1315 are documents that are accessible to the distributed computing device 1310, but not permanently stored on the distributed computing device 1310. For example, the documents 1315 may be documents that the distributed computing device 1310 accesses from an external hard drive, from a networked server with dedicated storage for the distributed computing device 1310, from cloud-based storage, etc. The documents 1315 may be any file format, e.g., text files, PDFs, LaTeX, HTML, etc. In some embodiments, the documents 1315 form a general corpus of documents, such as a corpus of websites, a corpus of text-based documents, or a corpus including any files the distributed computing devices 1310 are willing to share with other distributed computing devices. In other embodiments, the documents 1315 form a specialized corpus of documents that users wish to share, such as resumes, dating profiles, social media profiles, research papers, works of fiction, computer code, recipes, reference materials, etc.

The LSI module 1320 uses the documents 1315 to generate, in conjunction with the other distributed computing devices, a low-dimension subspace in which the documents 1315 can be represented and compared. The LSI module 1320 includes a calculation module 1325 that operates on the documents 1315. Using the documents 1315, the calculation module 1325 generates word counts 1330 and sampled word counts 1335. Using the sampled word counts 1335 and working in conjunction with the other distributed computing devices, the calculation module 1325 generates the LSI subspace 1340.

First, the calculation module 1325 analyzes the documents 1315 to calculate the word counts 1330 for each document. To generate a latent semantic index, each document is first represented as a vector in which each vector element represents a distinct word. The value for each element in the word count vector is the number of times the corresponding word appears in the document. For example, if in a given document, the word "patent" appears five times and the word "trademark" appears three times, the element in the vector corresponding to "patent" is assigned a value of five, and the element corresponding to "trademark" is assigned a value of three. In other embodiments, the elements in the word count vector are mathematically related to the actual word counts, e.g., the values in the word count vector are normalized or otherwise proportional to the actual word counts of the document. The words represented by the vector elements can be, e.g., all words in a given dictionary, a set of words that excludes stop words, or a set of words that groups words with the same word stem (e.g., one element may group "patent," "patents," and "patenting,").

If the distributed computing device 1310 includes multiple documents 1315, the calculation module 1325 calculates a word count vector for each document. In some embodiments, the distributed computing device 1310 may combine multiple documents into a single vector (e.g., two related documents), or separate a single document into multiple word count vectors (e.g., a long document, or a document that has subsections). The calculation module 1325 concatenates the word count vectors for the documents 1315 to form a word count matrix.

The calculation module 1325 samples the word counts 1330 to calculate the sampled word counts 1335. The sampled word counts 1335 are a mathematical function of the word counts 1330 that involves random sampling, such as multiplying the matrix of word counts 1330 by a random matrix. The sampled word counts 1335 are shared with the other distributed computing devices in a peer-to-peer fashion. For example, distributed computing device 1310b shares its sampled word counts 1335b with both distributed computing device 1310a and distributed computing device 1310N, and receives the sampled word counts 1335a and 1335N from distributed computing devices 1310a and 1310N, respectively. The distributed computing devices 1310 form various sets of connections, as described with respect to FIGS. 4A and 4B, and exchange and average the sampled word counts until the distributed computing devices 1310 reach a consensus result according to the DAC algorithm, as described with respect to FIGS. 4A-5B.

While the sampled word counts 1335 of one of the distributed computing devices 1310 are shared with the other distributed computing devices 1310, the word counts 1330 do not leave any one of the distributed computing devices 1330. Representing the documents 1315 as word counts 1330 and then sampling the word counts 1330 to generate the sampled word counts 1335 that are shared among the distributed computing devices 1310 obscures the underlying documents 1315, so that privacy of the documents is maintained. For example, when distributed computing device 1310a receives the sampled word counts 1335b from another distributed computing device 1310b, the distributed computing device 1310a cannot recover the documents 1315b, or even the word counts 1330b, from the sampled word counts 1335b. This is advantageous for applications where users want other users to be able to find their documents, but do not wish to provide full public access to their documents.

The distributed computing devices 1310a-1310N run a consensus algorithm, such as the distributed average consensus (DAC) algorithm described above, on the exchanged sampled word counts 1335 to obtain a consensus result for the sampled word counts 1335. The distributed computing devices 1310a-1310N may also use a convergence indicator, such as the convergence indicator described above with respect to FIGS. 5A and 5B, to determine when a consensus result for the sampled word counts 1335 has been reached by all of the distributed computing devices 1310a-1310N. For example, the distributed computing devices 1310a-1310N perform the DAC process on matrices of the sampled word counts 1335 to obtain a global matrix of the same size as the matrices of the sampled word counts 1335. When the convergence indicator indicates that a distributed average consensus for the sampled word count matrices has been achieved (i.e., that the exchanged and averaged sampled word count matrices have converged), each calculation module 1325 independently calculates an LSI subspace 1340 from the consensus result. While FIG. 13 indicates that all distributed computing devices 1310 have the same LSI subspace 1340, the calculated LSI subspaces may vary slightly between distributed computing devices 1310, e.g., within a margin of error tolerance permitted for consensus. The distributed computing devices 1310 can then apply the LSI subspace 1340 to analyze their own documents 1315 and to search for documents on other distributed computing devices.

As described above, using the DAC algorithm in conjunction with the convergence indicator to generate the LSI subspace ensures that each distributed computing device 1310 has contributed to the coordinated subspace construction effort undertaken by the distributed computing devices 1310a-1310N. Unlike prior latent semantic indexing methods, processes for generating a latent semantic index according to embodiments herein run without the need for a central server. In addition, using sampled word counts 1335, rather than raw documents or full word counts 1330, and performing the DAC algorithm reduces the computational resources required for each distributed computing device 1310. The amount of data in the documents 1315, and even in the word counts 1330, generated by all distributed computing devices 1310 can be large. For example, the word counts 1330 are typically sparse but very large matrices, particularly when a distributed computing device 1310 contains a large number of documents 1315. While a matrix of sampled word counts for a single distributed computing device's documents can be stored on and manipulated by a single distributed computing device 1310, if the number of distributed computing devices N is large, a single distributed computing device may not be able to store all of the sampled word count data generated by the N distributed computing devices, or even a portion of the N distributed computing devices. In performing the DAC process, the distributed computing devices 1310 exchange and manipulate matrices of the size of the matrix of sampled word counts 1335 to generate a global matrix of the same size as the matrix of sampled word counts 1335. At no point during the DAC process does a distributed computing device 1310 store close to the amount of word count data or sampled word count data generated by all N devices.

As an example, $A_i \in \mathbb{R}^{N \times k_i}$ represents a matrix of word counts 1330 of the $k_i$ documents local to node i for i={1, ..., $N_{nodes}$}, and $A=[A_1, \ldots, A_{N_{nodes}}] \in \mathbb{R}^{N \times (k_i N_{nodes})}$ represents the global data set of all word counts 1330. N is the length of the word count vectors. The cooperative subspace approach computes, in a fully distributed fashion, a representative LSI subspace, $U \in \mathbb{R}^{N \times q}$, which approximates the range of A such that $\|A-UU^T A\| \leq \epsilon \|A\|$, where $\epsilon$ is a user specified tolerance on the accuracy of the approximation between 0 and 1.

Figure 14:
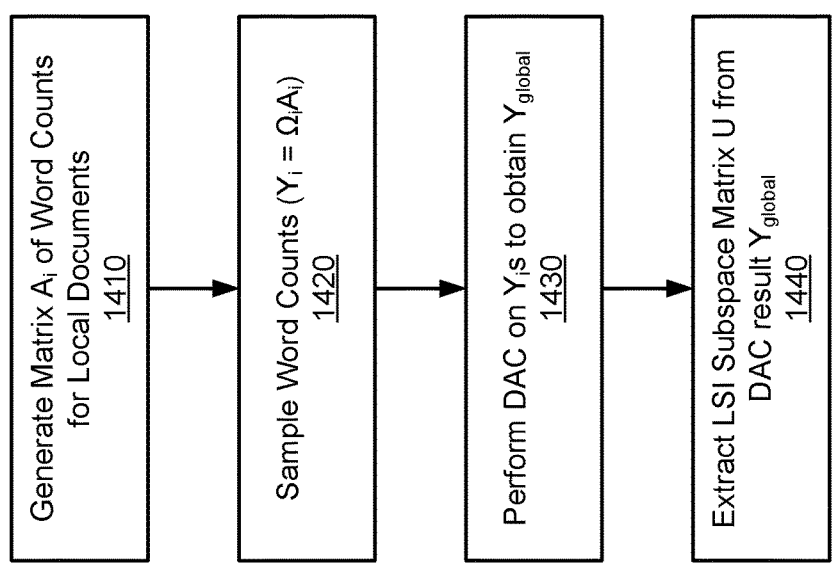
FIG. 14 is a flowchart showing a method for generating a low-dimension subspace for latent semantic indexing using distributed average consensus, according to one embodiment.

FIG. 14 is a flowchart showing a method for generating a low-dimension subspace for latent semantic indexing using distributed average consensus at a particular node i, e.g., one of the distributed computing devices 1310. The LSI module 1320 generates 1410 a local word count matrix $A_i$ for a set of local documents. As an example, as described above, the calculation module 1325a calculates the word counts 1330a for a set of documents 1315a accessible to the distributed computing device 1310a.

The LSI module 1320 samples 1420 the local word counts data $A_i$. For example, the calculation module 1325 generates a random matrix $\Omega_i \in \mathbb{R}^{k_i \times q}$ and multiplies the random matrix $\Omega_i$ by the local word count matrix $A_i$. The random matrix $\Omega_i$ is a matrix of random values, e.g., a Gaussian ensemble matrix. Each distributed computing device 1310 generates the random matrix independently. The calculation module 1325 multiplies its local word count matrix $A_i$ and the random matrix $\Omega_i$ generate the outer product $Y_i = A_i \Omega_i \in \mathbb{R}^{N \times q}$. The matrix $Y_i$ is an example of the sampled word counts 1335, and approximates the data in the local word count matrix $A_i$ (i.e., $Y_i$ approximates the word counts 1330).

The LSI module 1320 of the distributed computing device 1310, in cooperation with the other distributed computing devices, performs 1430 the DAC algorithm on the sampled word count matrices $Y_i$ to obtain a global DAC result matrix $Y_{global}$, which is the global matrix representing a consensus result for the matrices of sampled word counts 1335. $Y_{global}$ can be represented as follows:

$$Y_{Global} = \frac{1}{N_{nodes}} A[\Omega_1^T, \ldots, \Omega_{N_{nodes}}^T]^T \in \mathbb{R}^{N \times q}$$

During a first iteration of DAC process, a distributed computing device 1310 exchanges its sampled word count matrix $Y_i$ with another distributed computing device 1310. For example, distributed computing device 1310a transmits the sampled word counts 1335a to the distributed computing device 1310b, and receives sampled word counts 1335b from distributed computing device 1310b. The LSI module 1320 calculates an average of its sampled word count matrix $Y_i$ and the sampled word count matrix received from the other distributed computing device. For example, the calculation module 1325a of the LSI module 1325a calculates an average of its matrix of sampled word counts 1335a and the received matrix of sampled word counts 1335b. This results in consensus sampled word count matrix, which is a matrix of the same size as the sampled word count matrix $Y_i$. In subsequent iterations, distributed computing devices 1310 exchange and average their current consensus sampled word count matrices. The consensus sampled word count matrices are repeatedly exchanged and averaged until a consensus result across the distributed computing devices 1310 is reached. The consensus result, which is the matrix $Y_{global}$, is obtained when the consensus sampled word counts are substantially the same across all the distributed computing devices 1310, e.g., within a specified margin of error. The convergence indicator described with respect to FIGS. 5A and 5B may be used to determine when the consensus result $Y_{global}$ has been reached, and to determine whether all distributed computing devices 1310 participated in determining the consensus result.

While a full word count matrix $A_{global}$ including the word counts of all documents in the corpus may be too large to be stored on $Y_i$, and therefore the consensus sampled word count matrices and the global consensus result $Y_{global}$, are sufficiently small to be stored on and manipulated by a single distributed computing device 1310.

After calculating the DAC result $Y_{global}$, the LSI module 1320 extracts 1440 a low-dimension LSI subspace matrix U from the DAC result $Y_{global}$ that spans the range of $Y_{global}$. For example, the calculation module 1325 performs a local unitary decomposition, i.e., $Y_{global}$=UR, to obtain U, or performs another form of orthogonal decomposition. Following the decomposition, the distributed computing device 1310 (and each other cooperating distributed computing device) holds a copy of the representative subspace, $U \in \mathbb{R}^{N \times q}$, which approximately spans the range of the global word count data matrix $A_{global}$. The LSI subspace matrix U is a low-dimension subspace 1340 (e.g., has a low dimension relative to $A_{global}$) that the LSI module 1320 can use for various applications. For example, the LSI module 1320 can project a document into the LSI subspace 1340 to determine the latent semantic content of a document, or the LSI module 1340 can compare the latent semantic content of multiple documents by projecting the documents into the same LSI subspace.

Figure 15:
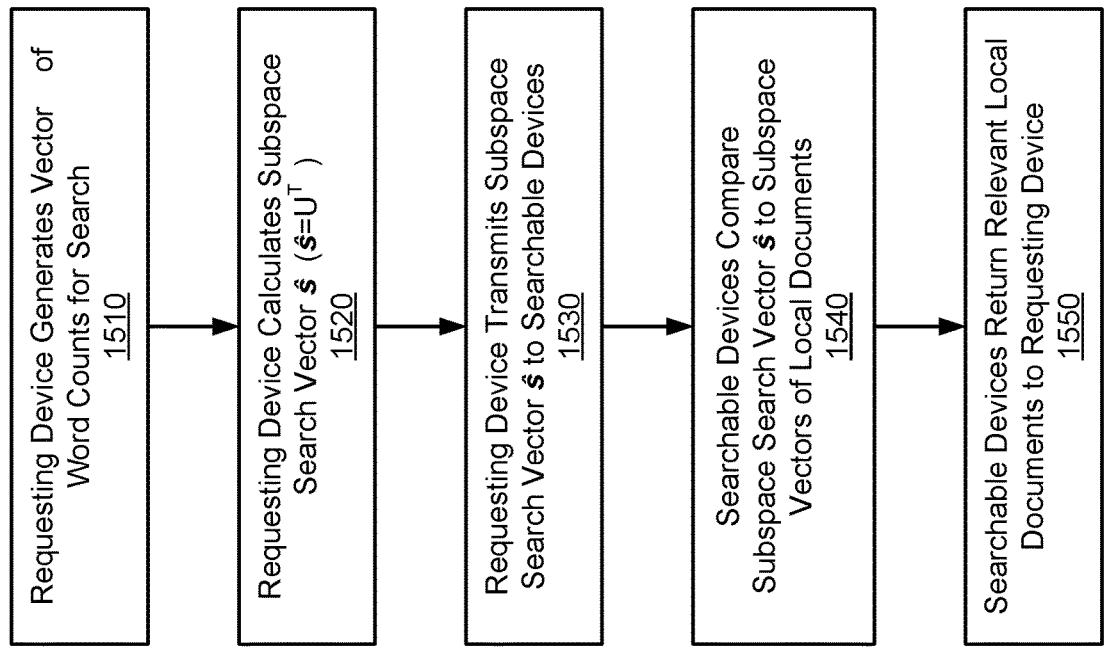
FIG. 15 is a flowchart showing a method for searching for documents in the distributed environment based on the latent semantic index, according to one embodiment.

FIG. 15 is a flowchart showing a method for searching for documents in the distributed environment based on the LSI subspace, according to one embodiment. A requesting device, e.g., one of the distributed computing devices 1310, receives a search request and generates 1510 a vector s of word counts for the search. The search request may be, for example, a set of keywords, or one or more documents. For example, to perform a search of job candidates by searching users' resumes, a searching user (e.g., a hiring manager) may input a set of skills and attributes, e.g., "Python", "PhD", "volunteer", etc., into an interface of the requesting device. Alternatively, the searching user may provide or select (e.g., from the documents 1315) one or more resumes of current, successful employees or other candidates to search for similar candidates. A calculation module 1325 of the requesting device generates the word count vector s in a similar manner to generating the word counts $A_i$.

The requesting device then calculates 1520 a subspace search vector ŝ by projecting the word count vector s into the LSI subspace. For example, the calculation module 1325 generates the subspace search vector ŝ by multiplying the word count vector s by the transpose of the LSI subspace matrix $U^T$, i.e., ŝ=$U^T$s. The subspace search vector characterizes the search request in the LSI subspace, and is a lower-dimension vector than the word count vector s (i.e., ŝ$\in \mathbb{R}^q$, s$\in \mathbb{R}^N$, q<N). For the resume search example, the subspace search vector characterizes the skills and attributes being sought by a hiring manager in the LSI subspace.

The requesting device transmits 1530 the subspace search vector ŝ to a set of searchable devices for document searching. The searchable devices are a set of devices that accept search requests from requesting devices, and that have a copy of the LSI subspace matrix U. In some embodiments, the searchable devices include the same distributed computing devices 1310 that cooperated to generate the LSI subspace matrix U, or a subset of these distributed computing devices. In some embodiments, the searchable devices include devices that did not cooperate to generate U, but obtained U from another device.

The searchable devices each compare 1540 the received subspace search vector to subspace vectors in the same LSI subspace used to characterize the searchable devices' local documents (e.g., documents 1315). The subspace vectors characterizing searchable devices' local documents for searching are referred to as target vectors. Each searchable device calculates the target vectors in the same manner as the subspace search vector was calculated in 1520. The searchable devices may calculate and store the target vectors for their local documents prior to receiving the request, e.g., after obtaining the LSI subspace matrix U at 1440 in FIG. 14, or after receiving the LSI subspace matrix from another device. To compare the search vector to a target vector describing a searched document, a searchable device (e.g., the calculation module 1325 of the searchable device) may calculate a dot product of the search vector and the target vector, a Euclidean distance between the search vector and the target vector, or some other measure of distance between the two vectors.

The searchable devices return 1550 any local documents, or data describing local documents, that were determined to be relevant to the requesting device's search. For example, if a searchable device calculates a Euclidean distance to compare the search vector to the target vector or each local document, the searchable device may provide data describing any documents with target vectors that have a Euclidean distance to the search vector below a threshold value. Alternatively, a searchable device may return data describing a set of documents with the closest match (e.g., the ten closest matching documents), or data describing all documents and their match value. The match value indicates the measure of distance between the search vector and the target vector. The returned data may include a document identifier, the match value (e.g., the Euclidean distance or the dot product), and some information describing the document, such as a title, author, date of creation or publication, etc. The information returned may depend on the context; for example, for a resume search, the searchable device may return a candidate overview (e.g., current position, desired position, location) that is machine-generated or supplied by the candidate. Based on the returned results, the searching device may request one or more full document from one or more searchable devices.

In some embodiments, one or more searchable devices store target vectors describing documents stored on one or more other devices. In this case, a searchable device (e.g., a web server) compares the search vector to each target vector stored by the searchable device, on behalf of the other devices storing the documents. Unlike prior search engines, the searchable device does not access the full documents, but instead only receives the target vectors that characterize the documents in the subspace from the documents' owners. In response to a search request, the searchable device can return information for retrieving matching documents from the devices that store the matching documents.

The LSI subspace matrix U can be used for other applications besides document searching. As another example, to determine a set of relevant words (e.g., keyword) for a given document with word count vector a, the calculation module 1325 of a distributed computing device 1310 projects the word count vector a into the LSI subspace 1340 by calculating the product ã$32$ UU$^T$a, ã$\in \mathbb{R}^N$. The values in the resulting vector ã, each of which corresponds to a particular word in the set of N words (e.g., the set of words in a particular dictionary), indicates the relevance of each word to the document. The words that have high values (e.g., the five or ten words corresponding to the highest values in the vector ã) can be selected as keywords to describe the document.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for generating a latent semantic index comprising:
   calculating, by a distributed computing device, word counts for each of a set of documents, wherein the word counts for each of the set of documents are represented as a plurality of values, each value representing a number of times a corresponding word appears in one of the set of documents, wherein the plurality of values representing the word counts for each document in the set of documents are arranged as a word count vector, wherein the word counts for the set of documents are arranged as a word count matrix;
   calculating, by the distributed computing device, sampled word counts by randomly sampling the word counts, wherein calculating the sampled word counts by randomly sampling the word counts comprises calculating a sampled word count matrix by multiplying a random matrix and the word count matrix;
   iteratively executing, by the distributed computing device, in conjunction with a plurality of additional distributed computing devices connected to the distributed computing device by a network, a process to determine a consensus result for the sampled word counts, the consensus result based on the sampled word counts calculated by the distributed computing device and additional sampled word counts calculated by the plurality of additional distributed computing devices, the additional sampled user word counts based on additional sets of documents;
   determining, by the distributed computing device, a latent semantic index (LSI) subspace based on the consensus result for the sampled word counts, the LSI subspace reflecting contents of the set of documents and the additional sets of documents, wherein the consensus result is a global consensus matrix of a same dimensionality as the sampled word count matrix, and wherein determining the LSI subspace based on the consensus result for the sampled word counts comprises extracting an LSI subspace matrix from the global consensus matrix using orthogonal decomposition; and
   projecting, by the distributed computing device, a document into the LSI subspace to determine the latent semantic content of the document.

2. The method of claim 1, wherein projecting a document into the LSI subspace to determine the latent semantic content of the document comprises multiplying a search word count vector of the document by a transpose of the LSI subspace matrix to generate a subspace search vector characterizing the document in the LSI subspace, the method further comprising:
   transmitting the subspace search vector to a second distributed computing device as a search request; and receiving, from the second distributed computing device, data describing a target document that matches the search request, wherein the second distributed computing device determines the target document matches the search request by comparing the subspace search vector to a target vector characterizing the target document in the LSI subspace.

3. The method of claim 1, wherein projecting a document into the LSI subspace to determine the latent semantic content of the document comprises:
multiplying a document word count vector of the document by a transpose of the LSI subspace matrix and the LSI subspace matrix to generate a resulting vector, each element in the resulting vector having a value corresponding to a different word; and
extracting, as keywords to describe the document; a set of words corresponding to elements in the resulting vector having high values.

4. The method of claim 1, wherein iteratively executing the process to determine the consensus result comprises, for a first iteration of the process:
transmitting, over the network, the sampled word counts of the distributed computing device to a second distributed computing device of the plurality of additional distributed computing devices;
receiving, over the network, second sampled word counts generated by the second distributed computing device from the second distributed computing device; and
calculating consensus sampled word counts by computing an average of the sampled word counts and the second sampled word counts.

5. The method of claim 4, wherein iteratively executing the process to determine the consensus result comprises, for a second iteration of the process:
transmitting, over the network, the consensus sampled word counts of the distributed computing device to a third distributed computing device of the plurality of additional distributed computing devices;
receiving, over the network, additional consensus sampled word counts generated by the third distributed computing device from the third distributed computing device; and
updating the consensus sampled word counts by computing an average of the consensus sampled word counts and the additional consensus sampled word counts.

6. The method of claim 5, wherein, after a plurality of iterations, the consensus sampled word counts calculated by the distributed computing device substantially converge with consensus sampled word counts calculated by each of remaining ones of the plurality of additional computing devices, and the consensus sampled word counts calculated by the distributed computing device are the consensus result.

7. A non-transitory computer readable storage medium configured to store program code, the program code comprising instructions that, when executed by one or more processors, cause the one or more processors to:
calculate word counts for each of a set of documents of a distributed computing device, wherein the word counts for each of the set of documents are represented as a plurality of values, each value representing a number of times a corresponding word appears in one of the set of documents, wherein the plurality of values representing the word counts for each document in the set of documents are arranged as a word count vector, wherein the word counts for the set of documents are arranged as a word count matrix;
calculate sampled word counts by randomly sampling the word counts, wherein calculating the sampled word counts by randomly sampling the word counts comprises calculating a sampled word count matrix by multiplying a random matrix and the word count matrix;
iteratively execute, in conjunction with a plurality of additional distributed computing devices connected to the distributed computing device by a network, a process to determine a consensus result for the sampled word counts, the consensus result based on the sampled word counts calculated by the distributed computing device and additional sampled word counts calculated by the plurality of additional distributed computing devices, the additional sampled user word counts based on additional sets of documents;
determine a latent semantic index (LSI) subspace based on the consensus result for the sampled word counts, the LSI subspace reflecting contents of the set of documents and the additional sets of documents, wherein the consensus result is a global consensus matrix of a same dimensionality as the sampled word count matrix, and wherein determining the LSI subspace based on the consensus result for the sampled word counts comprises extracting an LSI subspace matrix from the global consensus matrix using orthogonal decomposition; and
project a document into the LSI subspace to determine the latent semantic content of the document.

8. The non-transitory computer readable storage medium of claim 7, wherein the instructions to project a document into the LSI subspace to determine the latent semantic content of the document comprise instructions to multiply a search word count vector of the document by a transpose of the LSI subspace matrix to generate a subspace search vector characterizing the document in the LSI subspace, and the instructions further comprise instructions to:
transmit the subspace search vector to a second distributed computing device as a search request; and
receive, from the second distributed computing device, data describing a target document that matches the search request, wherein the second distributed computing device determines the target document matches the search request by comparing the subspace search vector to a target vector characterizing the target document in the LSI subspace.

9. The non-transitory computer readable storage medium of claim 8, wherein the instructions to project a document into the LSI subspace to determine the latent semantic content of the document comprise instructions to:
multiply a document word count vector of the document by a transpose of the LSI subspace matrix and the LSI subspace matrix to generate a resulting vector, each element in the resulting vector having a value corresponding to a different word; and
extract, as keywords to describe the document; a set of words corresponding to elements in the resulting vector having high values.

10. The non-transitory computer readable storage medium of claim 7, wherein the instructions to iteratively execute the process to determine the consensus result comprise instructions to, for a first iteration of the process:
transmit, over the network, the sampled word counts of the distributed computing device to a second distributed computing device of the plurality of additional distributed computing devices;

receive, over the network, second sampled word counts generated by the second distributed computing device from the second distributed computing device; and calculate consensus sampled word counts by computing an average of the sampled word counts and the second sampled word counts.

11. The non-transitory computer readable storage medium of claim 10, wherein the instructions to iteratively execute the process to determine the consensus result comprise instructions to, for a second iteration of the process:

transmit, over the network, the consensus sampled word counts of the distributed computing device to a third distributed computing device of the plurality of additional distributed computing devices;

receive, over the network, additional consensus sampled word counts generated by the third distributed computing device from the third distributed computing device; and update the consensus sampled word counts by computing an average of the consensus sampled word counts and the additional consensus sampled word counts.

12. The non-transitory computer readable storage medium of claim 11, wherein, after a plurality of iterations, the consensus sampled word counts calculated by the distributed computing device substantially converge with consensus sampled word counts calculated by each of remaining ones of the plurality of additional computing devices, and the consensus sampled word counts calculated by the distributed computing device are the consensus result.

* * * * *